(12) United States Patent
Beattie, Jr. et al.

(10) Patent No.: US 11,606,723 B2
(45) Date of Patent: *Mar. 14, 2023

(54) END-TO-END INTEGRATION OF AN ADAPTIVE AIR INTERFACE SCHEDULER

(71) Applicant: AT&T Intellectual Property I, L.P., Atlanta, GA (US)

(72) Inventors: James Gordon Beattie, Jr., Bergenfield, NJ (US); John Bartell, Milton, GA (US); Haywood S. Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,085

(22) Filed: Dec. 13, 2021

(65) Prior Publication Data

US 2022/0104072 A1 Mar. 31, 2022

Related U.S. Application Data

(63) Continuation of application No. 16/932,414, filed on Jul. 17, 2020, now Pat. No. 11,234,167.

(51) Int. Cl.
*H04W 28/18* (2009.01)
*H04B 17/336* (2015.01)
*H04W 24/08* (2009.01)
*H04W 28/24* (2009.01)

(52) U.S. Cl.
CPC ......... *H04W 28/18* (2013.01); *H04B 17/336* (2015.01); *H04W 24/08* (2013.01)

(58) Field of Classification Search
CPC ..... H04W 28/18; H04W 24/08; H04W 28/24; H04B 17/336
See application file for complete search history.

(56) References Cited

U.S. PATENT DOCUMENTS

| 9,705,803 | B1 | 7/2017 | Oroskar et al. |
| 2007/0140113 | A1* | 6/2007 | Gemelos ............. H04L 41/5009 370/465 |
| 2010/0091652 | A1* | 4/2010 | Lin ...................... H04L 47/805 370/231 |

(Continued)

*Primary Examiner* — Harry H Kim
(74) *Attorney, Agent, or Firm* — Guntin & Gust, PLC; Ralph Trementozzi

(57) ABSTRACT

A method includes receiving a request for delivery of content to a point-of-delivery device over a wireless network, wherein the request includes one or more service metrics and a Quality of Service Class Identifier ("QCI"), facilitating an allocation of resources of the wireless network based on the service metrics and the QCI, sending wireline transmission parameters associated with the service metrics and the QCI to a wireline manager of a wireline network wherein the wireline network is in communication with the wireless network, establishing an end-to-end communication channel between a content collection point and the point-of-delivery device using a combination of the wireline network and the wireless network and delivering the content to the point-of-delivery device via the end-to-end communication channel in accordance with the wireline transmission parameters, the service metrics and the QCI.

19 Claims, 16 Drawing Sheets

(56) References Cited

U.S. PATENT DOCUMENTS

| | | | |
|---|---|---|---|
| 2010/0103872 A1* | 4/2010 | Park | H04W 36/0011 370/328 |
| 2012/0269110 A1* | 10/2012 | Walker | H04W 28/16 370/312 |
| 2015/0215793 A1 | 7/2015 | Siomina et al. | |
| 2016/0262044 A1 | 9/2016 | Calin et al. | |
| 2017/0201902 A1 | 7/2017 | Chen et al. | |
| 2018/0033449 A1* | 2/2018 | Theverapperuma | G10L 25/30 |
| 2020/0053591 A1 | 2/2020 | Prasad | |
| 2020/0244765 A1 | 7/2020 | Uppili | |
| 2021/0204207 A1 | 7/2021 | Fiorese et al. | |
| 2022/0302998 A1* | 9/2022 | Oga | H04B 7/18519 |

\* cited by examiner

ENEND-TO-END INTEGRATION OF AN
ADAPTIVE AIR INTERFACE SCHEDULER

CROSS REFERENCE TO RELATED
APPLICATIONS

This application is a continuation of U.S. patent application Ser. No. 16/932,414, filed on Jul. 17, 2020. All sections of the aforementioned application(s) and/or patent(s) are incorporated herein by reference in their entirety.

TECHNICAL FIELD

This disclosure is directed to a system and method for providing content to a point-of-delivery, and, more specifically, to coordinating delivery of content across a wireline and a wireless portion of a telecommunications network.

BACKGROUND

The wide adoption of mobile devices, fixed devices (e.g., a security camera), and home devices (e.g., an Internet-of-things (TOT) thermostat and Internet ready television), along with cellular data coverage has resulted in the unprecedented growth of mobile applications that are dependent on always-accessible wireless networking. The growth in the use of mobile applications has placed strains on increasingly scarcer resources, such as wireless spectrum. This scarcity may reduce or interrupt levels of service provided to the customer, which may cause dissatisfaction.

To meet the huge demand for mobile applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with wireless communication.

This background information is provided to reveal information believed by the applicant to be of possible relevance. No admission is necessarily intended, nor should be construed, that any of the preceding information constitutes prior art.

SUMMARY

The present disclosure is directed to a method including receiving a request for delivery of content to a point-of-delivery device over a wireless network, wherein the request includes one or more service metrics and a Quality of Service Class Identifier ("QCI"), facilitating an allocation of resources of the wireless network based on the service metrics and the QCI, sending wireline transmission parameters associated with the service metrics and the QCI to a wireline manager of a wireline network wherein the wireline network is in communication with the wireless network, establishing an end-to-end communication channel between a content collection point and the point-of-delivery device using a combination of the wireline network and the wireless network, and delivering the content to the point-of-delivery device via the end-to-end communication channel in accordance with the wireline transmission parameters, the service metrics and the QCI. The allocation of resources may include allocation of wireless control plane resources and wireless data plane resources. The wireline transmission parameters may include wireline control plane resources and wireline data plane resources. In an aspect, the QCI is an enhanced QCI comprising a measure of signal-to-interference-plus-noise ratio and at least one of device metrics, performance metrics, or device diagnostics.

In an aspect, the method may further include monitoring performance of the wireless network and, based on the monitoring, modifying the QCI to form an enhanced QCI comprising a measure of signal-to-interference-plus noise ratio from an initial value to a modified value QCI. The method may further include modifying the parameters of the wireline network based on the modified value QCI and transmitting the modified parameters to the wireline manager, and wherein the delivering is based on the modified value QCI and the modified parameters. In an aspect, the service metrics may include a priority level and wherein the wireline transmission parameters include the priority level. In an aspect, the point-of-delivery device includes a memory buffer for the content and wherein use of the memory buffer is based on the priority level. The method may further include coordinating delivery of the content with the wireline manager based on the use of the memory buffer.

In an aspect, the point-of-delivery device is a first point-of-delivery device and wherein the content originates from a second point-of-delivery device, and wherein the method may further include receiving response content from the first point-of-delivery device and delivering the response content to the second point-of-delivery device. The method may further include receiving second transmission parameters associated with the second point-of-delivery device and wherein the response content is delivered based on second transmission parameters and wherein the second transmission parameters are associated with one of the wireline network or the wireless network.

In an aspect, delivering to the point-of-delivery device may include delivering at least a first portion of the content to the point-of-delivery device and delivering at least a second portion of the content to an additional point-of-delivery device in accordance with one or more additional service metrics and an additional enhanced QCI and wherein the wireline transmission parameters are associated with the additional service metrics and the additional enhanced QCI. The wireline transmission parameters may include an indication that a delay associated with delivering the content is to be treated by the wireline manager as not inconsistent with the service metrics and wherein the delay is implemented by queuing content to an edge of the wireline network for delivery by the wireless network when the wireless resources are available.

In an aspect, the method may further include receiving wireline network performance metrics from the wireline manager and adjusting the allocation of wireless resources based on the wireline network performance metrics. The method may further include generating wireless network performance metrics and adjusting the wireline transmission parameters based on the wireless performance metrics. The service metrics may be associated with at least one of the access point, the point-of-delivery device, and a requested time of delivery. In an aspect, the point-of-delivery device may be moving and wherein the method further includes receiving a modified value QCI based on movement of the point-of-delivery device and the wireline transmission parameters are based on the modified value QCI. The request for content may include receiving the request from the point-of-delivery device and the enhanced QCI may be associated with the point-of-delivery device.

In an aspect, the service metrics are included in a service level agreement for the end-to-end communication channel, and wherein receiving the service metrics includes receiving the service level agreement. The method may further include operating an application service manager that facilitates one or more of the sending, the establishing or the delivering. The method may further include monitoring performance of the wireless network, wherein the application service manager facilitates the monitoring. In an aspect, an enhanced QCI is associated with one of the point-of-delivery device or a content delivery device other than the point-of-delivery device. At least one of the service metrics may be associated with the point-of-delivery device and the enhanced QCI may be associated with the point-of-delivery device.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
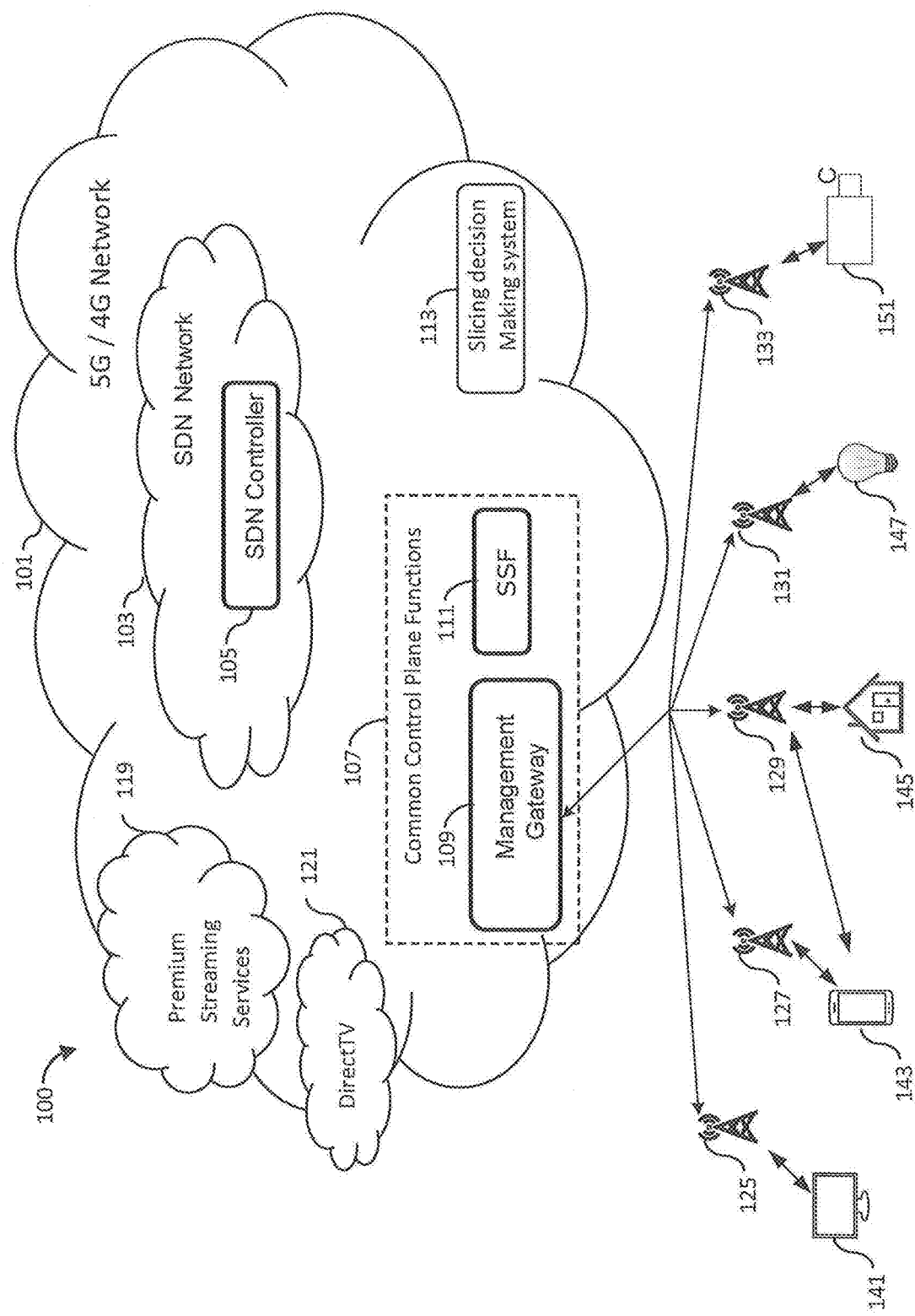
FIG. 1 is a block diagram of an exemplary operating environment in accordance with the present disclosure.

Overview. This disclosure is directed to a system and method for the effective provision of true end-to-end timing, throughput and error levels in a hybrid wireless-wired network through the use of performance data integration on a real end-to-end basis and not simply an edge-to-edge basis. This disclosure will enhance the delivery of premium end-to-end services constructed of both wireless and wired services with greater certainty of meeting demanding SLAs required by many applications. The system and methods of the present disclosure accounts for the end-to-end performance of the user service or application requirements by integrating the characteristic performance of the wireline network with those of the wireless packet scheduler. As such, the disclosure provides a practical application of processes and advances the state of the art in telecommunications networks.

In accordance with the present disclosure, a packet scheduler associated with the wireless network pulls, or alternatively pushes, performance data periodically for the connections of interest and then determines whether the end-to-end user experience would benefit from accelerated delivery of the data over the air interface, or whether delivery may be scheduled with normal queuing. There are several elements of protocol included in this management regime and as further detailed in the description below, including a Wireline Service Manager (WSM), a Radio Service Manager (RSM) and an Application Service Manager (ASM). These three elements working in a coordinated manner may provide information on the state of the end-to-end connection, performance metrics requirements and its actual performance.

Components of the system may include a service element in the ASM that identifies the service endpoint (physical or virtual) for an application that is subject to the SLA. The same or a different service element in the ASM that provides the SLAs for true end-to-end service for an application. There may also be service element in the wireline network's WSM that provides real-time, or near real-time performance data on the edge-to-edge connection across the wireline network for the application. There may be a service element in the RSM that assists the packet scheduler with the queuing management for the data coming from, or bound for, the wireline portion of the true end-to-end connection. The same or a different service element in the RSM may allow a user element UE to signal its desire to operate a communication with an application with specific SLAs. The same or different service element in the RSM may allow it to access queueing functions of both the radio packet scheduler and the backhaul connectivity, Finally, there may be the same or different service element of the RSM that associates an application and its SLAs with wireless network parameters such as APNs, QCIs, P-cells, S-cells, etc. in order to guide the traffic over the appropriate air and core network interfaces. The foregoing is described in more detail below.

In accordance with an embodiment, delay data may be pushed both ways. The end-to-end network may have its most important parameter be delay and therefore drop packets near the source if the end-to-end delay is exceeded. This may be accomplished by the components of the management system to calculate the end-to-end delay. This may be focused for a single network or aggregated networks.

In accordance with an embodiment, instead of dropping packets to meet strict delay parameters, the management system may alert the application that the delay objective cannot be met with the current network configuration. By changing the queue delay, accelerators would allow for lower delay at the cost of higher packet loss, of alternatively, packet loss may be reduced through the Routing through Energy and Link (REL) Routing Protocol (RRP) with higher delay which may, for example, be implemented by using longer data paths or delay can be reduced with higher packet loss manifested by overflowing queues. By knowing the actual delay through the LTE network traffic through the RRP network may be managed, even if it means having lower priority traffic dropped to make way for the high priority traffic.

In accordance with an embodiment, LTE or 5G wireless networks may allow for alternate routing, for example, switching towers. In that case, then the RRP may be extended fully to the LTE network for a true, end-to-end optimization.

Management integration of the network may provide end-to-end visibility wherein delay may be monitored and controlled from end-to-end. Delay could be monitored and controlled from end to end.

The ASM may reside in an application provider such as Netflix or HBO Max, or alternatively, reside in a service provider network.

In an embodiment, the radio service manager may be similar to a packet-scheduler in a wireless network, which would provide scheduling to one site or across multiple sites. The radio service manager may communicate the packet-scheduler parameters to the wireline service manager to provide the same or compatible performance parameters for the wireline network, including the bandwidth requirements for delivery. In an embodiment, a user may request delivery of content from the application service manager which then causes an end-to-end communication session to be established. The session may be static which may, for example, mean that the point-of-delivery device is not moving, or the session may be dynamic, which may, for example, mean the point-of-delivery device is in motion. It is also possible that the point-of-delivery device may change, for example, from consuming content at a fixed location on a television screen and then moving to a wireless point-of-delivery device during the content communication session to consume the content while in motion.

The RSM may be incorporated in the eNB in the wireless network. The RSM may manage the control plane resources required for the implementation of the disclosure. In a software defined network, the RSM may cause the instantiation of multiple virtual network functions to provide for those control plane resources. Likewise, on the wireline side, similar or compatible control plane resources may be provided by the WSM. In that way, the wireless network and the wireline network may appear to work more homogenously from the perspective of the ASM and the user requesting the content.

In an example, the service metrics may provide for a fixed latency at a fixed priority which may determine whether the content may be buffered. The content may be pushed to the network edge and then prioritized for delivery based on the service metrics. Using predictive analytics or other methods, if the point-of-delivery device is in motion, the pattern of movement may be determine and changes in the wireless network characteristics such as loading, latency, time-of-day, etc. may be anticipated and resources may be added or subtracted based on the anticipated need. Any such changes may then be synchronized with compatible changes on the wireline side.

In an aspect, the communications link may be bi-directional. For example, the content may include audio-video content relating to surgical procedures and one or more point-of-delivery devices may provide questions, feedback or other content back to the other point-of-deliver devices in real time or near real time. Law enforcement applications may include similar bi-directional content creation and delivery. As such, the present disclosure provides for multiple uplinks and multiple downlinks in which the content delivery is managed across the hybrid wireline-wireless network through the interactions of the ASM, RSM and WSM.

Parameters such as QCI may be enhanced to provide an enhanced QCI to provide more dynamic performance parameters and more tailored to the application which may, for example, consider the use and availability of control plane resources which may be considered an additional factor of an enhanced QCI.

Figure 4:
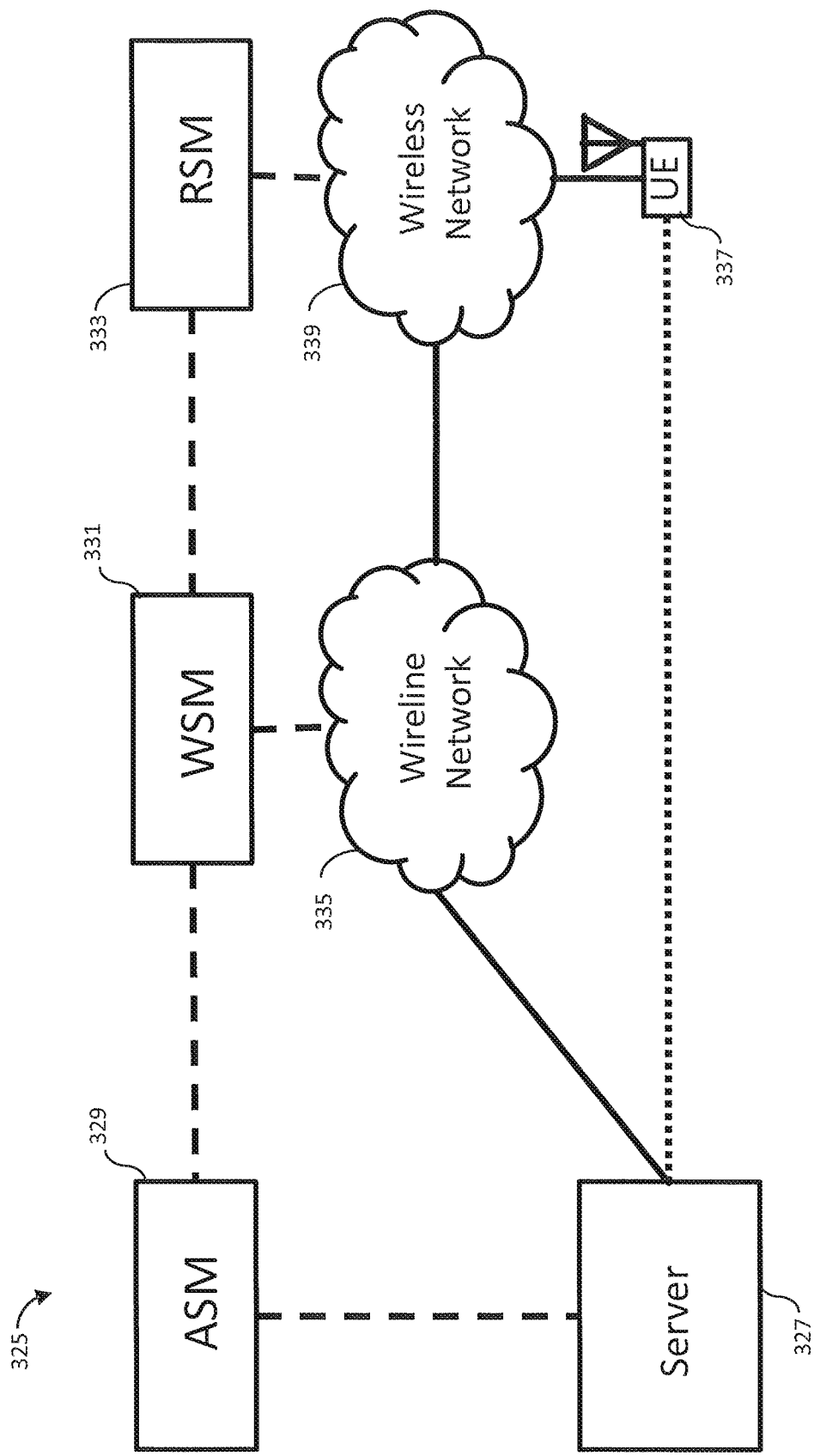
FIG. 4 is a block diagram illustrating a media and communication network in accordance with the present disclosure.

System Architecture. An exemplary system architecture is illustrated in FIGS. 1 and 4. An air interface may be used for the radio transmission between mobile devices 143 and a base station 127 in a cellular network 339 and defines a frequency, channel bandwidth, and a modulation scheme. The air interface may be a wireless counterpart of the physical layer 1 in an Open Systems Interconnection (OSI) model.

Conventionally, the air interface uses specialized scheduling functions to deliver data from a wired infrastructure network to a wireless device and vice versa. However, conventional implementations of the air interface are not arranged to integrate the performance components of the wired network with those of the wireless network. In conventional wireless systems, data is delivered across the air interface using a priority mechanism driven by a basic set of classes of service; however, this approach fails to consider the characteristics of a dataflow operating across a wired portion of an end-to-end connection.

Hence, conventional air interfaces fail to ensure a suitable end-to-end performance necessary for premium end-to-end services, which may affect agreed upon services and performance requirements established in Service Level Agreements (SLAs). The disclosed system may integrate the characteristic performance of a wireline network with those of a wireless packet scheduler in order to deliver content in a manner that meets SLAs or has the ability to delay delivery of the content and allows a radio channel to be used for higher priority traffic.

The system 100 described herein utilizes an Application Service Manager (ASM) 329 that may be used to determine a flow of data from a server capable of fulfilling a service request and request resources to fulfill the service request while considering an end-to-end basis from one or more Wireline Service Managers (WSMs) 331 and Radio Service Managers (RSMs) 334. The service request may be coordinated with a user equipment (UE) 143 to determine the capabilities of the UE 143, including the UE's likely movement during an anticipated session connection. The system 100 may further utilize the RSM 334 to determine the priority flows of data across a wireless network. While more capable than a traditional packet scheduler for a set of carriers for a single site's air interfaces, the RSM 344 may also schedule data flows across the air interfaces of groups of carriers. The system may further utilize the WSM 331 to determine a priority flows of data across a wireline network 335. The WSM 331 may receive session connection requests from the ASM 329 with associated expectations for service quality and location(s) for delivery. The WSM 331 may use the received session connection requests to coordinate with other WSMs 331 and RSMs 334 to build an end-to-end connection ecosystem in order to ensure quality and cost-effective delivery of data during the session connection.

Illustrated in FIG. 1 is an exemplary communication network 100 which provides access to network resources according embodiments of the present disclosure. In an SDN environment (e.g., an environment in which the typical set of "devices" are white boxes whose functionality is determined by software enablement), what had previously been described as a "node" takes on a different realization. In an SDN environment, a node may include a single white-box or a cluster (more than one, cooperating or acting independent) of white-boxes. As such, when the term node is used, a "cluster node" is a potential realization.

A communication network 101 includes a software defined network (SDN), SDN network 103. The SDN network 103 may be controlled by one or more SDN controllers. For example, the SDN network 103 may include an SDN controller 105. The SDN controller 105 may be a computing system executing computer executable instructions or modules to provide various functions. In one or more embodiments, multiple computer systems or processors may provide the functionality illustrated and described herein with respect to the SDN controller 105. The SDN controller 105 may include various components or can be provided via cooperation of various network devices or components. For example, SDN controller 105 may include or have access to various network components or resources, such as a network resource controller, network resource autonomous controller, a service resource controller, a service control interpreter, adapters, application programming interfaces, compilers, and network data collection or analytics engine (not shown). The SDN controller 105 may also include access information describing available resources and network information, such as network objects statistics, events or alarms, topology, or state changes. The SDN controller 105 may use, generate, or access system configurations, including configuration of resources available to the SDN controller 105 for providing access to services.

The communication network 101 may be provided with common control plane functions 107 that include a management gateway such as MGW 109 and a slice selection function (SSF) such as SSF 111. Network slicing is a form of virtualization that allows multiple logical networks to run on top of a shared physical network infrastructure. Network slicing may provide an end-to-end virtual network encompassing not just networking but compute and storage functions. A (SSF) mays select a network slice for the communication device. When selecting the network slice for the device, the SSF may process charging rules that are mapped to the network slices authorized for the device. The MGW 109 can capture traffic entering the communication network 101 from various communication devices (e.g., display and television devices 141, mobile devices 143, home and business networks 145, Internet of Things (IoT) devices 147, video and audio devices 151) that enters the communication network 101 via one or more air interfaces (e.g., 4G radio access network (RAN) 125, 4G LTE RAN 127, 4G RAN LTE 131, 4G RAN 133 and 5G RAN 129).

The MGW 109 may communicate with the SDN network 103 through SDN controller 105 regarding traffic entering the communication network 100. The MGW 109 and the SDN controller 105 may communicate via an OpenFlow protocol. The MGW 109 may inform the SDN controller 105 of information regarding services sought by one or more communication devices (e.g., display and television devices 141, mobile devices 143, home and business networks 145, Internet of Things (IoT) devices 147, video and audio devices 151), which may serve as an endpoint. The SDN Controller 105 is an application in a software-defined network that manages flow control to enable intelligent networking. The SDN controller 105 may allow servers to tell switches where to send packets. The SDN controller 105 may also analyze requested services to determine the service functions and or network data flows that would be required to facilitate delivery of the services to the communication devices.

The SSF 111 may be responsible for selecting the appropriate slice per user utilizing, for example, 5G RAN 129. The SSF 111 may include a network interface for receiving indications of triggering events and for transmitting instructions, a processor, and a non-transient memory for storing instructions. The instructions, upon execution by the processor, cause the slice selection function to select a second slice as a target slice; and to initiate a migration of the mobile device to the selected target slice in response to a slice reselection triggering event associated with a communication device. In some instances, a slice reselection triggering event may occur when there is a change in the service requirements of the mobile device. The instructions which cause the slice selection function to initiate a migration of the communication device to the selected target slice may be responsive to a slicing decision-making system 113.

The slicing decision making system 113 may determine the appropriate slice based on certain criteria (e.g., a built-in policy or set of policies). The criteria may be related to the type of customer, the service area, needed coverage for special events, the user equipment, and the services being requested, such as high speed capabilities at specific locations of the geographic region according to a schedule or according to service agreements that are tied to locations (e.g., businesses or homes paying a premium for ability to offer 5G RAN). For example, the service delivery enforced by the slicing decision making system 113 may be based on the following class criteria described in Table 1.

TABLE 1

Most-Preferred customers
Most-Critically Needed customers (e.g., senior citizen, first responders, hospitals)
Most-Critically Needed Event Coverage (e.g., Super Bowl, Olympics, World Cup,)
Highest Priority devices (e.g., iPhone 6)
Highest Priority Services (e.g., VoLTE launch, etc.).

The SDN controller 105 may determine what specific network functions are required to facilitate the requested service or services. For example, the requested services may be a premium streaming service 119 (e.g., HBO Max) or a DirecTV service 121, which have been requested by, for example, display and television devices 141 or mobile device 143. The SDN controller 105 may also analyze policies for the requested service or services. The policies may include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

The communications device may establish wireless communications with 4G RAN 125, 4G LTE RAN 127, 4G LTE RAN 131, 4G RAN 133, or 5G RAN 129 to start a communication session. The communications device may utilize a portal to start the session. The portal may be a function of an application residing on the communications device as a standalone application or as a client application to a server application of the network 100. The portal functionality enables the communications device to request particular service features directly or indirectly. Accordingly, the communications device may use the portal to generate a service request. The service request may include service feature data indicating service features desired or needed for a service being created or instantiated via the SDN controller 105. Alternatively, the service request can be a bare request for access to a service. In this case, the SDN controller 105 may determine the nature of the service and the functionality and resources required for providing the service.

Figure 2:
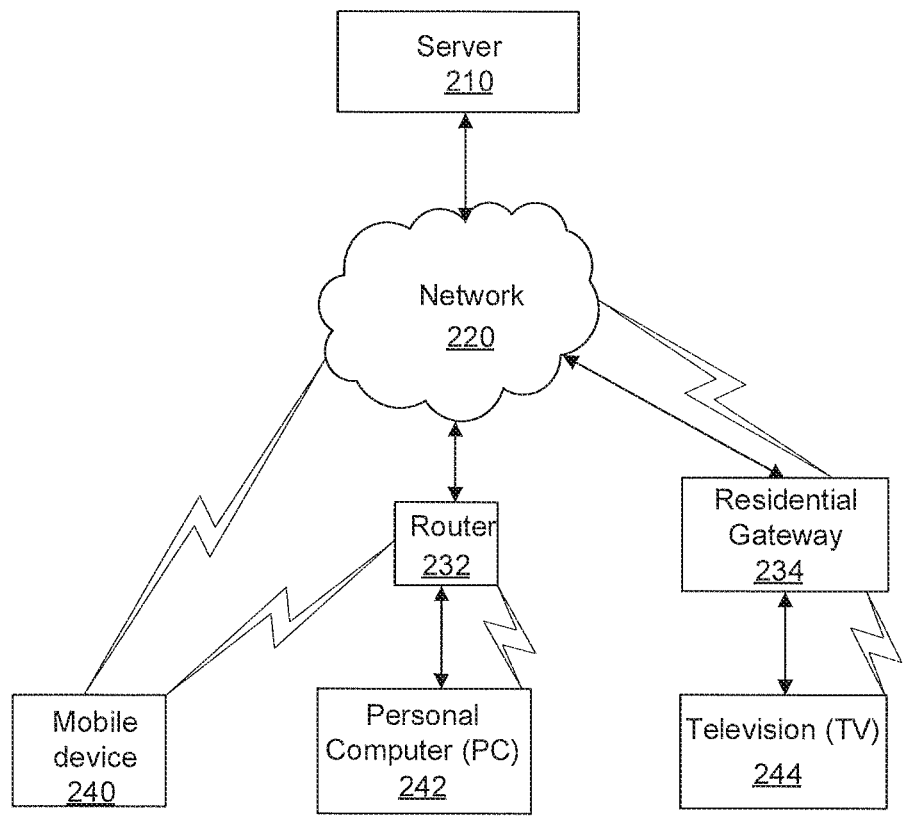
FIG. 2 is a block diagram illustrating a media and communication network in accordance with the present disclosure.

FIG. 2 is a block diagram 200 illustrating a media and communication network according to embodiments of the present disclosure. A server 210, which may be operated by a service provider (e.g., HBO), may be configured to provide hardware and software infrastructure for the delivery of content (e.g., streaming content), as well as provide communication channels for subscribers or other users to consume the content. Examples of communication channels include: Internet access, telephone services (e.g., voice-over-IP), interactive television and gaming, 2D and 3D video, virtual reality content, augmented reality content, multimedia, etc. The server 210 may acquire programming from content providers or may be a content provider and encode the content. The server 210 may also add local programming and provide additional digital services such as video on demand, and storage for content according to user directions.

The server 210 may be coupled with a network 220, which may include communication network 101, to distribute the content, provide Internet access, provide telephone services, provide streaming, etc. The network 220 may serve as an intermediate infrastructure between a point-of-delivery (e.g., mobile device 240, personal computer (PC) 242, and television (TV) 244) and the server 210. Exemplary points-of-delivery may also include display and television devices 141, mobile devices 143, home and business networks 145, Internet of Things (IoT) devices 147, and video and audio devices 151.

The server 210 may include and utilize an end-to-end packet controller-manager (PC-M) to communicate or apply service levels in the SLA across a wireline portion of the infrastructure for network 220 and across a wireless portion of the infrastructure for network 220 to ensure that an end-to-end service complies with the SLA. The PC-M may be used to coordinate a wireline packet scheduler that allocates wireline resources (e.g., router 232 and residential gateway 234) in response to receiving a content delivery request and a wireless packet scheduler that allocates wireless resources (e.g., RAN resources) in response to receiving the content delivery request. Accordingly, the PC-M may account for an end-to-end performance of a user service or application by integrating the service metrics of the wireline portions of network 220 (e.g., key performance indicators (KPI), network performance monitoring (NPM) metrics) and wireless (e.g., channel quality indicator (CQI), Quality Of Service (QOS), access point name (APN), QoS class identifier (QCI), P-cells, S-cells, etc.) when delivering the requested content. Some service metrics will be as currently understood by those skilled in the arts, while other service metrics may be enhanced in accordance with the present disclosure. For example, QCI as presently understood may be enhanced to include additional parameters, including but not limited to, a measure of signal plus interference to noise ratio, device metrics, device movements, performance metrics, or device diagnostics. QCI may be used by the eNBs to control the priority of packets to be delivered over the wireless portion of the network.

The server 210 may distribute the content using an application service manager (ASM), which may be stored on server 210. The ASM may be used to identify a service endpoint (e.g., mobile device 240, personal computer (PC) 242, and television (TV) 244 for an application that is subject to the Service Level Agreement (SLA). The service endpoint may be a physical or virtual endpoint.

The mobile device 240 may be a mobile device of mobile devices 143. The PC 242 may be coupled with home and business networks 145 and the TV 244 may be one of display and television devices 141.

Infrastructure associated with the network 220 (e.g., hub offices, IP service offices, local loop carrier facilities, satellite carrier facilities, communication satellites, telecom point-of-presence, mobile switching centers, base stations (e.g., evolved NodeBs (eNodeBs) or next generation NodeBs (gNodeBs), distribution nodes, etc.) may be configured to provide media content (television, movie, music, video, etc.) delivery, a plain-old-telephone system, satellite television, Internet services including streaming, wireless communications, such as cellular mobile phone services, etc.

A wireline portion of the infrastructure for network 220 may include one or more packet-switched networks that use cables or data lines to connect a service to a location. The wireline portion of network 220 may be linked by network devices, such as repeaters, hubs, switches, bridges, and routers, which are connected by coax cable, fiber optic cable, USB cable, HDMI cable, etc.

The wireline portion of network 220 may also include a wireline service manager (WSM). The WSM may provide real-time or near real-time performance data for an edge-to-edge connection across the wireline portion of network 220 for an application (e.g., HBO GO®, Netflix®, Hulu®, Spotify®, Pandora®, etc.).

A wireless portion of the infrastructure for network 220 may be a 4G LTE or 5G wireless network including an evolved packet core (EPC) network. The EPC network provides various functions that support wireless services in the 4G LTE or 5G environment. In one example, EPC network may be an Internet Protocol (IP) packet core network that supports both real-time and non-real-time service delivery across the 4G LTE and 5G network. The eNodeBs or gNodeBs may be accessed by communication devices that may communicate with the EPC to obtain wireless services.

The wireless portion of network 220 may also include a radio service manager (RSM). The RSM may assist a wireless packet scheduler in providing queuing management for data coming from or bound for the wireline portion of network 220. The RSM may also allow a communication device to communicate, via a service request, a desire to conduct communications (e.g., streaming, VoIP, geo-location-based service, etc.) with an application according to one or more SLAs. The RSM may also allow access to queueing functions of both a radio packet scheduler and a backhaul connectivity. The RSM may also associate an application and any associated SLAs with wireless network parameters (e.g., APNs, QCIs, P-cells, S-cells, etc.), in order to direct the traffic over designated air and core network interfaces.

Accordingly, for 4G LTE (e.g., 4G LTE RAN 127), radio related control functions may reside in an associated RAN eNodeB. For 5G (e.g., 5G RAN 129), radio related control functions may reside in an associated RAN gNodeB. These control functions can comprise radio admission control, resource allocation control, and dynamic resource allocation, which for LTE is done in the eNodeB's packet scheduler and for 5G is done in the gNodeB's packet scheduler. Accordingly, the packet scheduler (4G LTE and 5G) may maximize throughput of a communication device (e.g., mobile device 240 and TV 244, respectively) based upon the different channel conditions and traffic loads encountered by the communication device in order to allocate RAN resources to different sessions of different communication devices. The packet scheduler may also allocate RAN resources of a 4G LTE RAN (e.g. 4G LTE RAN 127) or 5G (e.g., 5G RAN 129) to provide a media streaming session, (e.g., streaming a movie via HBO GO) to mobile device 240 or TV 244, respectively. The allocation of RAN resources may be in consideration of the following parameters: a packet size, a type of media, e.g., whether the session is for real-time (live) streaming or stored media, and whether the mobile device 240 is stationary or in motion.

For example, parameters may be received by the packet scheduler from the mobile device 240 in a communication at or prior to the start of the media streaming session. Additional parameters may include information indicating whether an option for buffering is available for the mobile device 240, whether traffic for the session is bursty, latency and loss tolerances, etc.

Between the network 220 and the point-of-delivery, a router 232 may be used to provide digital services, such as Internet access. A computer or other Internet-capable device 242 may be coupled with the router 232 by a network cable to provide wired access to the network 220 or provide wireless access to the network 220. A residential gateway 234 may be used to provide content (e.g., via an Internet Protocol Television (IPTV) media system) to devices capable of viewing multimedia, such as mobile device 240, PC 242 or TV 244, via a wired connection (coax cable, fiber optic cable, USB cable, HDMI cable, etc.) or wirelessly (e.g., WiFi, Bluetooth®, Zigbee®, etc.).

In order to deliver (e.g., stream, download or otherwise transmit) content (e.g., media, VoIP, a conference bridge, geo-location services, etc.) to a point-of-delivery (e.g., mobile device 240, personal computer (PC) 242, and television (TV) 244), the ASM of the server 210 may coordinate content delivery with the WSM of the wireline portion of network 220 and the RSM of the wireless portion of network 220. The PC-M may communicate service levels agreed to in the SLA to the wireline portion of the infrastructure for network 220 and the wireless portion of the infrastructure for network 220 as part of the content delivery coordination to ensure that an end-to-end service complies with the SLA. For example, the server 210 (e.g., a video streaming service) may receive a service request from a customer for content delivery (e.g., a service request to initiate a media streaming session for viewing a movie). Accordingly, the ASM of the server 210 may obtain data associated with the service request which may be used to deliver the content in a desired manner, such as content delivery information and communication device information. Content delivery information may include content type (e.g., feature film movies, video clips, audio, etc.), SLA compliance (e.g., service quality, service availability, responsibilities, etc.), size/data volume of the content requested, an indication of whether the content may be transmitted in bulk or whether there is a maximum data transfer, a requested rendering format (e.g., 720p, 1080p, standard definition, high definition, ultra-high definition, etc.), buffered or live content (e.g., movie that may be viewed on demand versus a live sporting event), content length (e.g., hours, minutes, etc.), data compression (e.g., discrete cosine transform (DCT) and motion compensation (MC), MPEG Audio Layer III (MP3), Windows Media Audio, Advanced Audio Coding, etc.), or the like. The communication device information may include communication device type (e.g., TV, tablet, mobile phone, etc.), customer type, or mobility associated with device (e.g., stationary, mobile, or combination thereof), among other things. The ASM may also obtain additional information about the customer and customer resources. For example, the ASM may receive an indication that the customer is moving or stationary, an indication of a communication device type intended to receive the content (e.g., mobile phone, tablet, cable connected TV, internet connected TV, etc.), a buffering capacity of the communication device to receive the delivered content.

The ASM may coordinate content delivery with the WSM of the wireline portion of network 220 based on the data associated with the content delivery and the additional information about the customer and customer resources. During coordination, the ASM may communicate with the WSM in order to indicate what wireline resources of the wireline portion of network 220 (e.g., network devices, such as repeaters, hubs, switches, bridges, and routers, etc.) are needed to deliver the content requested to the point-of-delivery and a duration the wireline resources are needed to deliver the content requested to the point-of-delivery. Resources may be requested in consideration of, for example, a requested rendering or class of user. Accordingly, the WSM may reserve resources to deliver the requested content and prioritize a level of service for content delivery across the wireline portion of network 220 based on the communication with the ASM. If the content delivery is to a point-of-delivery that is wired communication device (e.g., a cable connected TV), the WSM may utilize the wireline portion of network 220 to deliver the content requested to the wired device based on the communication with the ASM.

If the content delivery is to a point-of-delivery that is a wireless communication device (e.g., mobile phone, tablet, internet connected TV, etc.), the WSM may coordinate with the RSM of the wireless portion of network 220 to deliver the requested content. The coordination may include a determination of how the requested content is transferred between the wireline portion of network 220 and the wireless portion of network 220. For example, the coordination between the WSM and RSM may be a communication exchange to determine wireline resources and wireless resources (e.g., radio related control functions residing in an associated RAN eNodeB or RAN gNodeB) used to deliver the requested content based on an anticipated content duration, a quality of service established for content delivery, and an anticipated vector of movement for the wireless communication device, if the wireless communication device is determined to be moving. Upon receiving the delivered content from the wireline portion of network 220, the wireless portion of network 220 may allocate RAN resources to deliver the requested content to the point-of-delivery.

Figure 3:
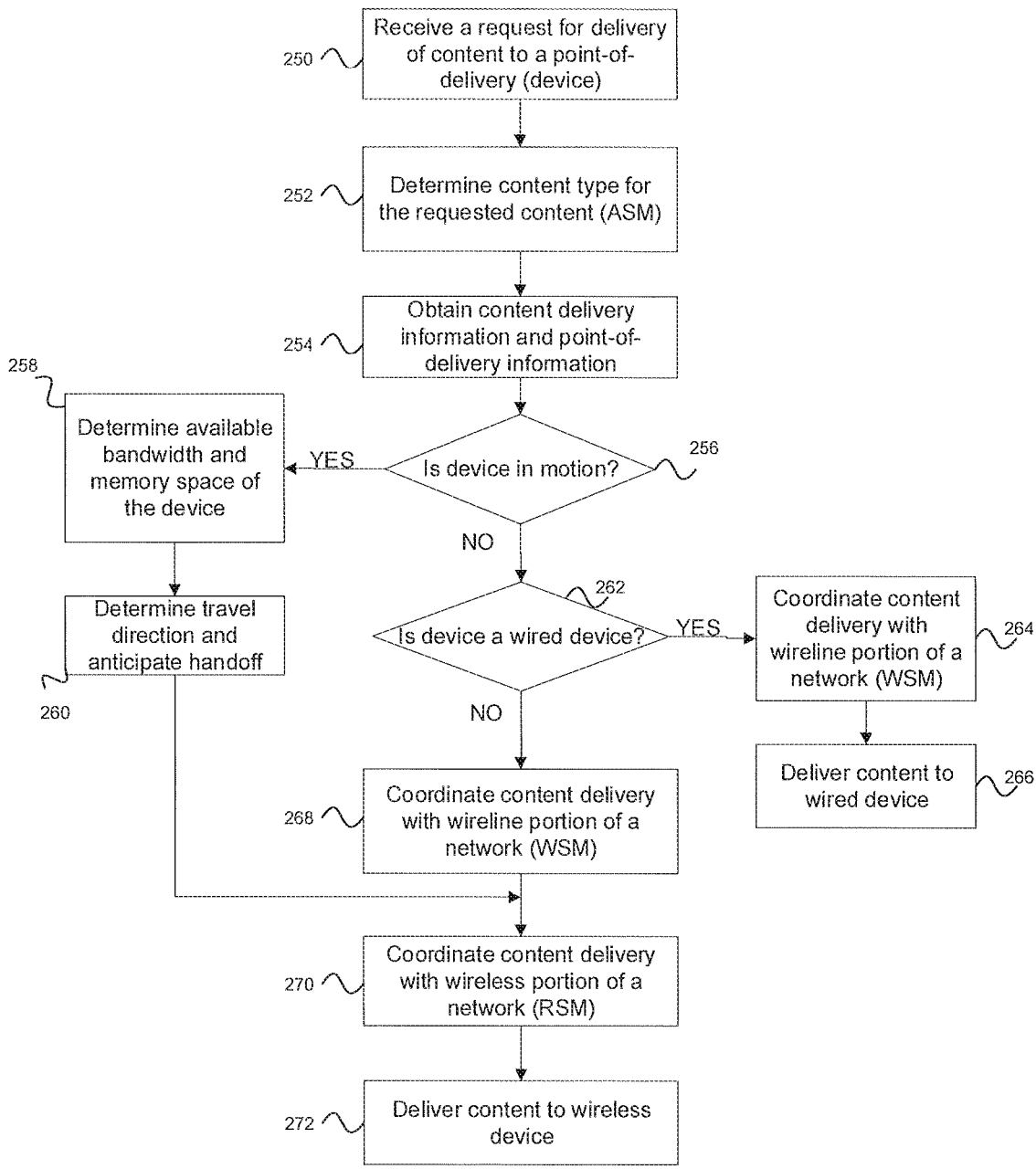
FIG. 3 is a flowchart of an exemplary method of operation in accordance with the present disclosure.

An exemplary operational flowchart in accordance with a method of the present disclosure is illustrated in FIG. 3. At block 250, a server 210 may receive a service request for delivery of content from a point-of-delivery (e.g., mobile device 250, PC 242 or TV 270). At block 252, the server 210 may determine a content type (e.g., media, VoIP, a conference bridge, geo-location services, etc.) associated with the service request. At block 254, the server 210 may obtain content delivery information (e.g., customer preference, customer type, content type, SLA compliance, size/data volume of the content requested, an indication of whether the content may be transmitted in bulk or whether there is a maximum data transfer, a requested rendering format (e.g., 720p, 1080p, standard definition, high definition, ultra-high definition, etc.), buffered or live content (e.g., live streaming of an event, which may include a 5-10 second latency or industry acceptable delay in displaying a live event), content length, data compression, etc.) and communication device information (e.g., communication device type, mobility associated with device, etc.) associated with the content requested. The server 210 may also obtain information about a communication device type of the device intended to receive the content (e.g., mobile phone, tablet, cable connected TV, internet connected TV, etc.) and a buffering capacity of the device.

At block 256, the server 210 may determine, based on the information received from the device, whether the device is in motion or stationery. If the server 210 determines that the device is in motion, at block 258, the server 210 may determine an available bandwidth (e.g., 25 megabytes per second (Mbps) for 4K streaming, 5 Mbps for high definition (HD) streaming, 3 Mbps for standard definition (SD) streaming, etc.) that may be used to transmit content to the device and a memory space available (e.g., 1.5 GB-8.5 GB, content file size based on content quality, such as HD, SD, etc.) on the device to store the content. At block 260, the server 210 determine a travel direction for the device (e.g., a vector) and use the travel direction to anticipate a location in which a handoff may occur between communication networks during delivery of content to the device. For example, the ASM may transmit additional data to the device prior to a handoff to allow for content to be streamed during the handoff thereby accounting for a poor connectivity handoff. The method would then proceed to block 270.

If the server 210 determines that the device is not in motion, at block 262, the server 210 may determine whether the device is a wired device (e.g., a cable connected TV) using the device information obtained. If the device is a wired device, at block 264, an ASM of the server 210 may coordinate with a WSM of wireline portion of the communication network to deliver the requested content to the device. For example, the ASM may communicate to the WSM which resources are needed to deliver the content to the device and how long those resources are needed. At block 266, the server 210 may utilize the wireline portion of the communication network to deliver the requested content to the device according to service level associated with the device.

At block 268, the ASM of the server 210 may coordinate with the WSM of the wireline portion of the communication network to coordinate delivery of the requested content to the device. For example, the WSM may allocate wireline resources to deliver the requested content to the device. At block 270, the ASM of the server 210 may coordinate with an RSM of the wireline portion of the communication network to coordinate delivery of the requested content to the device. For example, the RSM may allocate RAN resources to deliver the requested content to the device. In addition, the WSM and RSM may communicate with each other in order to coordinate delivery of the requested content to the device. At block 272, the content may be delivered to the device.

FIG. 4 is a block diagram 325 illustrating a media and communication network according to embodiments of the present disclosure. A service provider may be configured to provide hardware and software infrastructure (e.g. server 327) for the delivery of content (e.g., streaming content), as well as provide communication channels for subscribers or other users to consume the content. A path from the service provider to user equipment (UE) used to deliver content may be coordinated using ASM 329, WSM 331, or RSM 333. An ASM 329 may be coupled with or included in the server 327. The ASM 329 may be used to determine a flow of data (e.g., streaming content) from the server 327 and request resources from one or more of WSM 331 and RSM 333. The server 327 may also be coupled with a wireline network 335 and a wireless network 339 and may deliver content to UE 337 (e.g., cable connected TV, etc.) if connected via a wired connection (solid line) to the wireline network 335 and the wireless network 339. While UE 337 is shown as a single UE, that is for exemplary purposes only and it will be understood that multiple UEs may be attached to the wireless network in accordance with the present disclosure.

The WSM 331 may be coupled with or included in the wireline network 335. The WSM 331 may determine a priority for flows of data across the wireline network 335 and the wireless network 339. The WSM 331 may receive session connection requests from the ASM 329 which may specify a service quality, an anticipated duration for content delivery, and a location(s) for content delivery (e.g., UE 337) (e.g., mobile phone, tablet, cable connected TV, internet connected TV, etc.). The WSM 331 may also coordinate a path for the flows of data with the ASM 329, RSM 333 and potentially other WSMs to build an end-to-end connection (dotted line) to the location of delivery (UE 337) using wireline resources and wireless resources.

The RSM 333 may be coupled with or included in the wireless network 339. The RSM 333 may determines a priority flows for data across a wireless network (not shown). The RSM 333 may schedule data flows across an air interface(s) for a carrier(s) that accounts for carrier handoffs as a user (e.g. US 337) moves (e.g., transit from one city to another city) or as traffic loads may require.

Figure 5A:
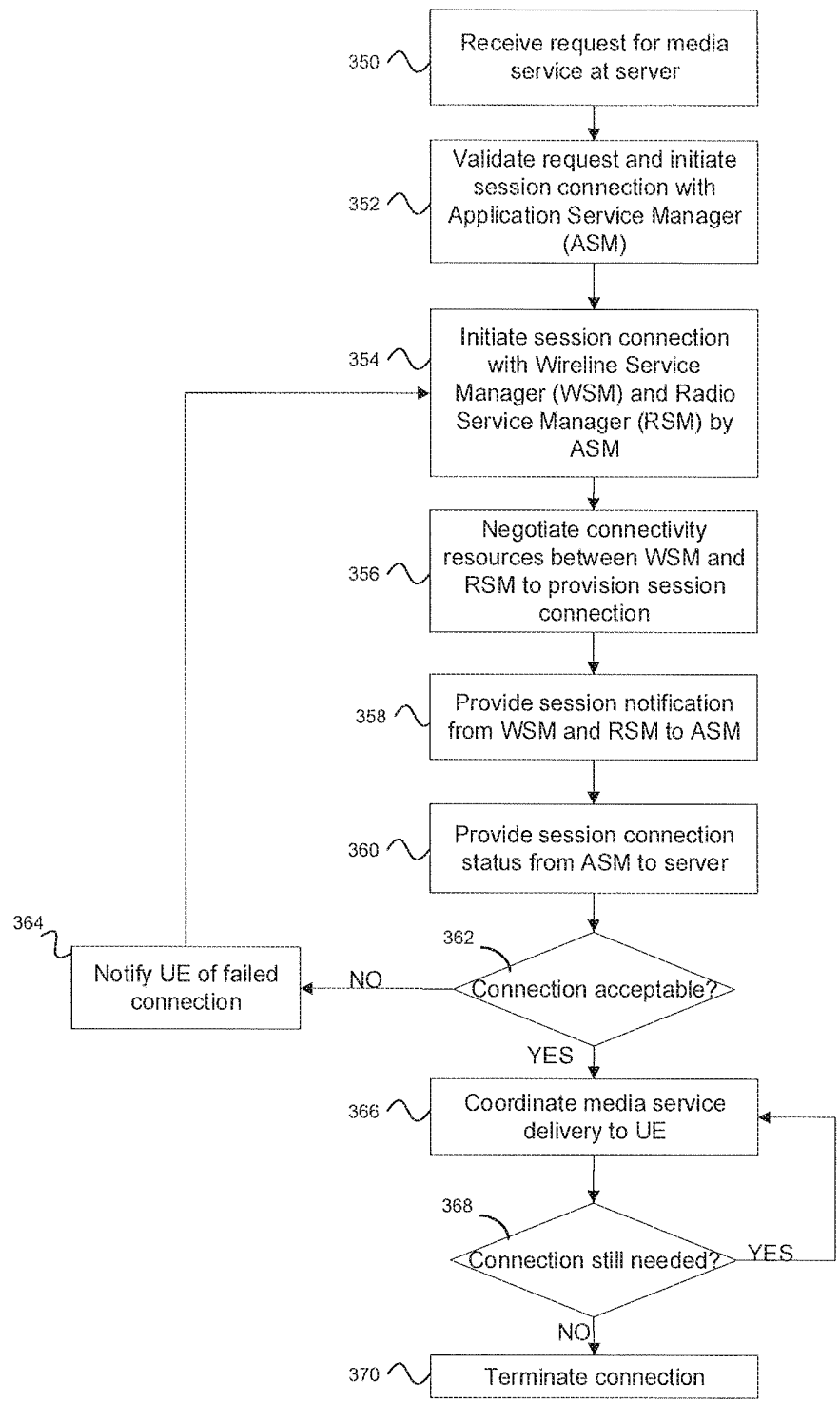
FIG. 5a is a flowchart of an exemplary method of operation in accordance with the present disclosure.

An exemplary operational flowchart in accordance with a method of the present disclosure is illustrated in FIG. 5a. At block 350, a server 327 (e.g., a media server) may receive a service request (e.g., a request for movie streaming) for delivery of content from UE 337. At block 352, the server 327 may validate the service request and initiate a session connection with the ASM 329 once the service request has been validated. At block 354, the ASM 329 may initiate a session connection with WSM 331 and RSM 333 to establish a connection to UE 337. At block 356, the WSM 331 and the RSM 333 may negotiate with each other regarding connectivity resources (e.g., wireline resources and wireless resources) that are to be used to fulfill the service request. At block 358, the WSM 331 and the RSM 333 may provide a notification (e.g., go, no-go, go-less) to the ASM 329 indicating whether a session connection has been established with the UE 337. At block 360, the ASM 329 may provide the server 327 with a session connection status indicating whether a session connection has been established with the UE 337.

At block 362, the server 327 may determine whether the session connection is acceptable to begin transmitting the requested content based on the session connection status received from the ASM 329. If the session connection is not acceptable, the method proceeds to block 364 where the server 327 may notify UE 337 that a session connection is not of sufficient quality to transmit the requested content. The method would then return to block 354.

If the session connection is acceptable, the method proceeds to block 366 where the server 327 coordinates with the ASM 329, the WSM 331 and the RSM 333 to maintain the session connection during the flow of data for the content is transmitted to the UE 337 (e.g., maintaining the session connection for the length of a movie, a song, a video, etc.).

At block 368, the server 327 may periodically determine whether the session connection should still be maintained. If the session connection should still be maintained, the method returns to block 366. If the session connection should not be maintained, the method proceeds to block 370 where the session connection is terminated via coordination between the server 327, the ASM 329, the WSM 331 and the RSM 333.

Figure 5B:
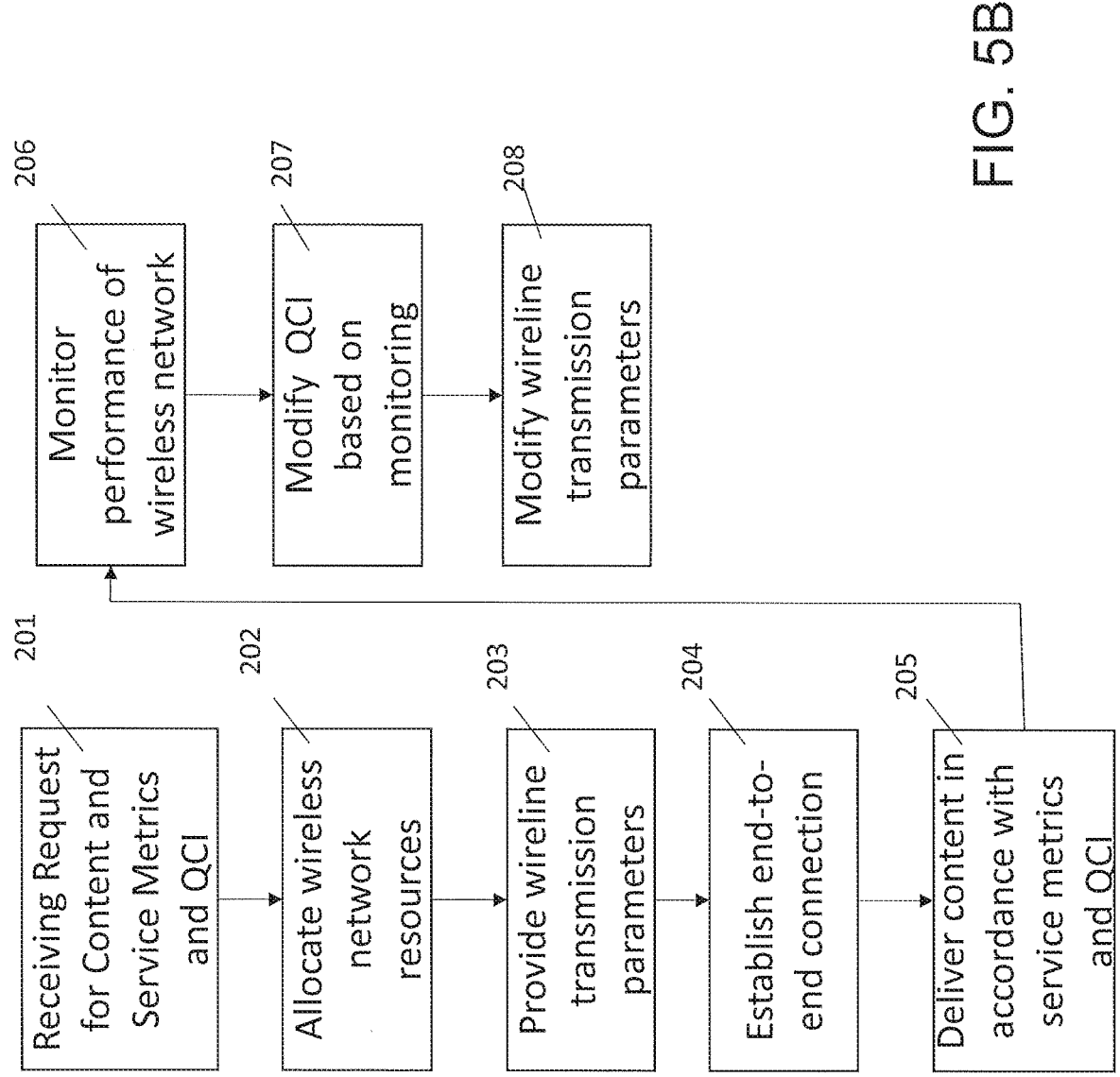
FIG. 5b is a flowchart of another exemplary method of operation in accordance with the present disclosure.

With reference to FIG. 5b, there is shown an exemplary process in accordance with the present disclosure from the perspective of the application service manager. At 201, the ASM receives a request for content, which may include service metrics and QCI. At 202, the wireless network manager allocates the wireless network resources. At 203, the wireline transmission parameters are provided to the wireline service manager. At 204, the end-to-end connection is established across the wireline and wireless network. At 205, the content is delivered to the point-of-delivery device in accordance with the service metrics and the QCI. At 206, the performance of the wireless network is monitored. At 207, the QCI may be modified based on the monitoring of the wireless network. At 208, the wireline transmission parameters are modified to be compatible with the modified performance metrics of the wireless portion of the network.

Figure 5C:
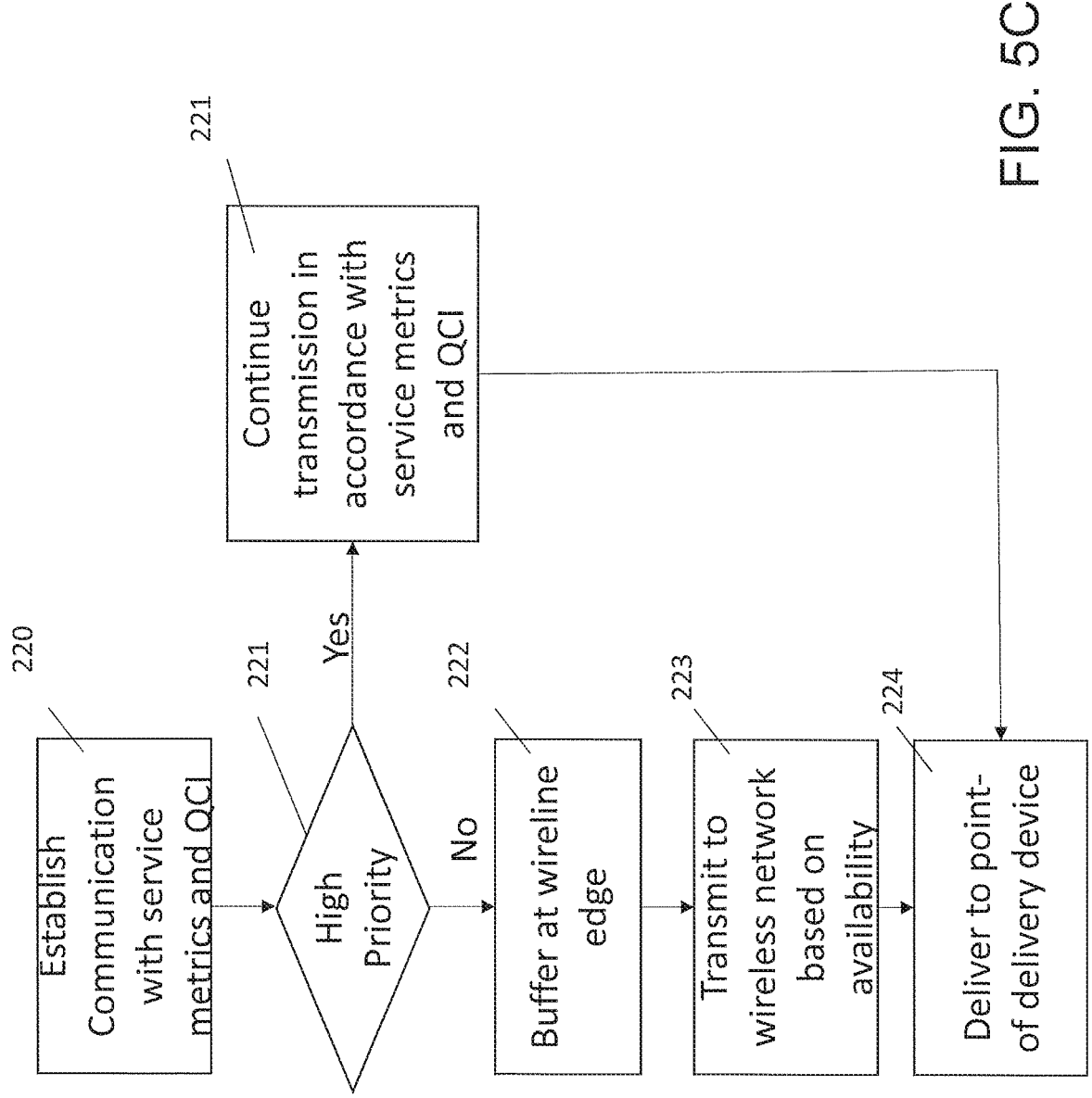
FIG. 5c is a flowchart of another exemplary method of operation in accordance with the present disclosure.

With reference to FIG. 5c, there is shown an exemplary flow diagram in accordance with the present disclosure from the perspective of the wireline service manager. At 220, the end-to-end communication session is established in accordance with the service metrics and QCI. At 221, there is a determination as to whether this communication is a high priority communication which, may, for example, include real-time or near real-time streaming to the point of delivery device. If this communication is high priority, the transmission continues at 221 in accordance with the service metrics and QCI. If not a high priority communication, which may, for example, mean that the content is to be stored and viewed at the point-of-delivery device at a later time, then the content may be processed and buffered at the edge of the wireline network and then transmitted across the wireless network based on wireless network availability. At 224, the content is delivered to the point-of-delivery device.

Figure 5D:
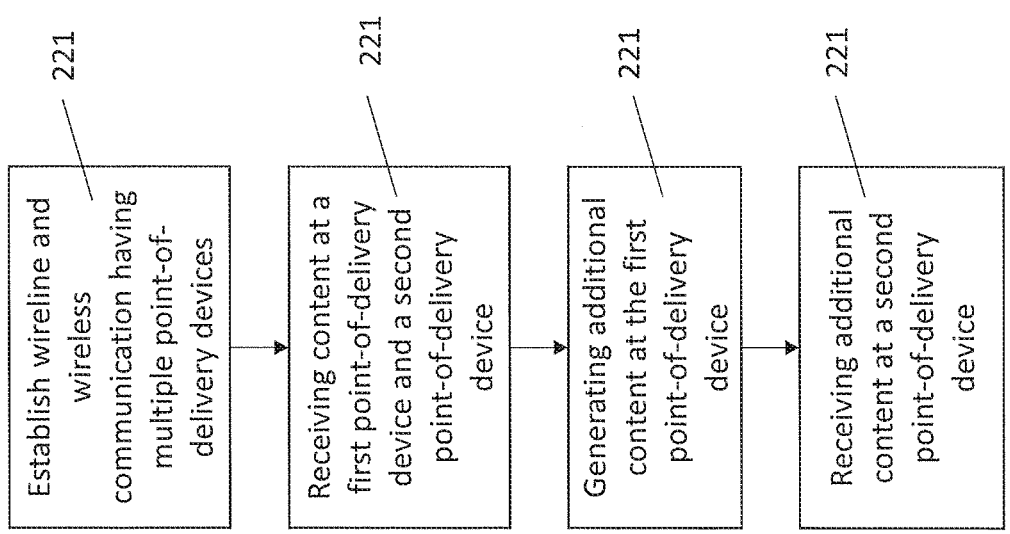
FIG. 5d is a flowchart of another exemplary method of operation in accordance with the present disclosure.

With reference to FIG. 5d, there is shown an exemplary flow diagram in accordance with the present disclosure showing a communication across a hybrid wireless-wireline network having multiple point-of-delivery devices. At 221, the communication is established. At 221, the content is received at a first point-of-delivery device and a second point-of-delivery device. At 221, additional content is generated at the first point-of-deliver device and that additional content is then received at the second point-of-delivery device at 221.

Accordingly, the present disclosure provides a system that may deliver content taking into account end-to-end timing, throughput, and error levels in a hybrid wireless-wired network through the use of performance components of the wired network with those of the wireless network to ensure a prescribed end-to-end performance (service provider to delivery endpoint).

The system described here goes beyond the basic functionality of conventional implementations that leverage a QOS to guide the packet scheduler of an eNodeB, to include input from the end-to-end packet controller-manager (PC-M). Accordingly, if there is a specific need or requirement for data delivery to have specific end-to-end SLA, then the PC-M may associate the data stream coming from or bound for the wireline network to an air interface's packet scheduler.

Instead of managing a connection quality on an edge-to-edge network utilized by previous implementations, which ignore a wireline portion of network, the PC-M may pull or push performance data periodically for the connections of interest and then decide whether an end-to-end experience requires accelerated delivery of the data over the air interface or whether delivery can be scheduled with normal queuing. The system may employ a wireline service manager (WSM), a radio service manager (RSM) and an application service manager (ASM). These WSM, RSM and ASM may provide information on a state of an end-to-end connection, along with associated requirements and performance. The WSM, the RSM, and the ASM may coordinate with each order provide content to the UE of a determined quality of service, for anticipated duration, and anticipate a physical vector for the UE if the UE is determined to be moving.

If the UE is determined to be stationary (e.g., internet connect TV, a mobile device or tablet in a home), the ASM may request a quality of service from the WSM and the RSM, which may be a higher quality. Further, the WSM and RSM may coordinate between each other in order to maintain the requested quality of service when delivering content to the UE. If, however, the UE is determined to be moving, the RSM and the WSM may coordinate between each other to deliver content to the UE. The RSM and the WSM may also coordinate with each other to mitigate some or all transmission degraded conditions due to the movement of the UE (e.g., a handoff may occur between communication networks while the UE is moving) in order to maintain a requested quality of service across the wireline portion of the network and the wireless portion of the network.

Accordingly, the system may provide end-to-end services constructed of both wireless and wired services that are intended to meet SLAs required by many applications that were heretofore limited to wired networks to a wireless environment. Accordingly, the system may be used in remote application, for example, telemedicine, especially in procedures implemented using a mobile remote surgical unit.

Additionally, the system may employ multiple wireline networks and accordingly, multiple WSMs. Coordination may occur among multiple WSMs and perhaps even multiple RSMs. In the case of multiple RSMs, it is likely that the UE is changing networks (e.g. cellular to Wi-Max or Wi-Fi)

or the UE is in motion and therefore changing radio management areas, thus causing RSMs to change.

ADDITIONAL EXAMPLES

The following are additional examples of the present disclosure.

Example 1: A system includes an application server, including a processor, and a memory coupled with the processor, the memory storing executable instructions that when executed by the processor, cause the processor to effectuate operations including receiving a request for delivery of content, obtaining content delivery information and communication device information from the request, determining whether the point-of-delivery is a wireless device based on the communication device information, coordinating with a wireline portion of a communications network for delivery of the content when the point-of-delivery is a wireless device, wherein coordinating with a wireline portion of a communications network includes communicating service metrics to the wireline portion of an infrastructure for the communications network as part of a content delivery coordination to ensure that an end-to-end service complies with the service metrics, coordinating with a wireless portion of the communications network for delivery of the content, wherein coordinating with a wireless portion of the communications network includes communicating the service metrics to the wireless portion of the infrastructure for the communications network as part of the content delivery coordination to ensure that an end-to-end service complies with the service metrics, and delivering, based on the content delivery information and the communication device information, the content to the point-of-delivery using the wireline portion of the communications network and the wireless portion of the communications network.

Example 2. The system of example 1 wherein the operations may further include coordinating with the wireline portion of the communications network for delivery of the content when the point-of-delivery is determined to be a wired device, and delivering, based on the content delivery information and the communication device information, the content to the point-of-delivery using the wireline portion of the communications network.

Example 3. The system of example 1 wherein the operations further include determining whether the point-of-delivery is in motion using the communication device information, determining an available transmission bandwidth when it is determined that the point-of-delivery is in motion, determining an available memory of the point-of-delivery, determining a direction of travel for the point-of-delivery, anticipating a location of a handoff to another communication network, and transmitting additional data for the content to the point-of-delivery to account for a poor connectivity handoff.

Example 4. The system of example 1 wherein a wireline service manager (WSM) may be used to provide performance data for an edge-to-edge connection across the wireline portion of the communications network.

Example 5. The system of example 1 wherein the coordinating with the wireline portion of the communications network for delivery of the content may include allocating, via a wireline packet scheduler, wireline resources to transmit the content across the wireline portion of the communications network to the wireless portion of the communications network.

Example 6. The system of example 5 wherein the operations further include allocating, via a wireless packet scheduler, wireless resources to transmit the content across the wireless portion of the communications network to the point-of-delivery device.

Example 7. The system of example 1 wherein the operations may further include coordinating between the wireline portion of the communications network and the wireless portion of the communications network for delivery of the content.

Example 8. The system of example 7 wherein the coordinating step between the wireline portion of the communications network and the wireless portion of the communications network includes allocating, via a wireline packet scheduler, wireline resources to transmit the content across the wireline portion of the communications network to the wireless portion of the communications network, and allocating, via a wireless packet scheduler, wireless resources to transmit the content across the wireless portion of the communications network to the point-of-delivery.

Example 9. The system of example 8 wherein the allocation of the wireline resources and the allocation of the wireless resources are based on an anticipated duration of the content, a quality of service for the content, and an anticipated vector of movement for the point-of-delivery.

Example 10. The system of example 9 wherein the content delivery information includes information indicating whether the content is buffered content or live content and wherein the content delivery information comprises a size of the content.

Example 11. A computer-implemented method including receiving, by a processor, a request for delivery of content, obtaining, by the processor, content delivery information and communication device information from the request, determining, by the processor, whether the point-of-delivery is a wireless device based on the communication device information, coordinating, by the processor, with a wireline portion of a communications network for delivery of the content when the point-of-delivery is a wireless device, wherein coordinating with a wireline portion of a communications network includes communicating service levels agreed to in a service level agreement (SLA) to the wireline portion of an infrastructure for the communications network as part of a content delivery coordination to ensure that an end-to-end service complies with the SLA, coordinating, by the processor, with a wireless portion of the communications network for delivery of the content, wherein coordinating with a wireless portion of the communications network comprises communicating service levels agreed to in the SLA to the wireless portion of the infrastructure for the communications network as part of the content delivery coordination to ensure that an end-to-end service complies with the SLA and delivering, by the processor, based on the content delivery information and the communication device information, the content to the point-of-delivery using the wireline portion of the communications network and the wireless portion of the communications network.

Example 12. The method of example 11 further include coordinating with the wireline portion of the communications network for delivery of the content when the point-of-delivery is determined to be a wired device, and delivering, based on the content delivery information and the communication device information, the content to the point-of-delivery using the wireline portion of the communications network.

Example 13. The method of example 11 further including determining whether the point-of-delivery is in motion using the communication device information, determining an available transmission bandwidth when it is determined that the point-of-delivery is in motion, determining an available memory of the point-of-delivery, determining a direction of travel for the point-of-delivery, anticipating a location of a handoff to another communication network; and transmitting additional data for the content to the point-of-delivery to account for a poor connectivity handoff.

Example 14. The method of example 11 a wireline service manager (WSM) may be used to provide performance data for an edge-to-edge connection across the wireline portion of the communications network.

Example 15. The method of example 14 wherein the coordinating with the wireline portion of the communications network for delivery of the content includes allocating, via a wireline packet scheduler, wireline resources to transmit the content across the wireline portion of the communications network to the wireless portion of the communications network.

Example 16. The method of example 15 further including coordinating with the wireless portion of the communications network for delivery of the content may include allocating, via a wireless packet scheduler, wireless resources to transmit the content across the wireless portion of the communications network to the point-of-delivery.

Example 17. The method of example 16 wherein a wireline service manager (WSM) may be used to provide performance data for an edge-to-edge connection across the wireline portion of the communications network and the method may include coordinating between the wireline portion of the communications network and the wireless portion of the communications network for delivery of the content.

Example 18. A computer-readable storage medium storing executable instructions that when executed by a computing device cause said computing device to effectuate operations including, receiving, from a point-of-delivery, a request for delivery of content, obtaining content delivery information and communication device information from the request, determining whether the point-of-delivery is a wireless device based on the communication device information, coordinating with a wireline portion of a communications network for delivery of the content when the point-of-delivery is a wireless device, wherein coordinating with a wireline portion of a communications network comprises communicating service levels agreed to in a service metrics to the wireline portion of an infrastructure for the communications network as part of a content delivery coordination to ensure that an end-to-end service complies with the SLA, coordinating with a wireless portion of the communications network for delivery of the content, wherein coordinating with a wireless portion of the communications network comprises communicating service levels agreed to in the service metrics to the wireless portion of the infrastructure for the communications network as part of the content delivery coordination to ensure that an end-to-end service complies with the SLA, and delivering, based on the content delivery information and the communication device information, the content to the point-of-delivery using the wireline portion of the communications network and the wireless portion of the communications network Example 19. The computer readable medium of example 18 wherein the operations further include determining an available transmission bandwidth when it is determined that the point-of-delivery is in motion, determining an available memory of the point-of-delivery, determining a direction of travel for the point-of-delivery, anticipating a location of a handoff to another communication network, and transmitting additional data for the content to the point-of-delivery to account for a poor connectivity handoff.

The disclosure is also directed to the system level, end-to-end network and associated processing.

Example 20. An end-to-end network including a wireline network having a wireline service manager, a wireless network in communication with the wireline network, the wireless network having a radio service manager, a content collection point for the network, the content collection point interfacing with an application server having an application service manager, and a point-of-delivery device in communication with the wireless network, wherein the radio service manager includes an input-output interface; a processor coupled to the input-output interface wherein the processor is further coupled to a memory, the memory having stored thereon executable instructions that when executed by the processor cause the processor to effectuate operations including receiving a request from the application service manager for delivery of content from the application server to the point-of-delivery device the application service manager, receiving service metrics from the application service manager associated with the request for delivery of content, receiving an initial Quality of Service Class Identifier ("QCI") from the point-of-delivery device, scheduling wireless resources to deliver the content based on the service level agreement and the initial enhanced QCI, and transmitting wireline transmission requirements to the wireline service manager compatible with the service level agreement and the initial enhanced QCI.

Example 21. The end-to-end network of example 20 wherein the operations further include receiving an updated enhanced QCI, scheduling updated wireless resources based on the updated enhanced QCI, and transmitting wireline transmission requirements to the wireline service manager compatible with the service level agreement and the revised enhanced QCI.

Example 22. A method including receiving, from a subscriber, a request for a delivery of a specified content to a point-of-delivery device, responsive to the request, providing to an application service manager one or more service metrics pertaining to the delivery, the application service manager providing a capability to manage an end-to-end communications channel comprising at least one wireless transport path and at least one wireline transport path, receiving, from the application service manager, a confirmation that the delivery can proceed in accordance with the one or more service metrics, and facilitating provision of the specified content to proceed with the delivery via the end-to-end communications channel under direction of the application service manager in accordance with the one or more service metrics.

Example 23. The method of example 22 wherein the facilitating provision of the specified content includes providing access to a cloud-based content repository from which at least a portion of the specified content is available, or providing access to an edge cache where at least a portion of the specified content is stored.

Example 24. The method of example 23 further including receiving a delivery report from the application service manager, the report including about the delivery, the information being obtained by monitoring at least one of the transport paths of the end-to-end communications channel.

Example 25. The method of example 24 wherein the report is received during the delivery or is received after completion of the delivery.

Example 26. The method of example 24 wherein the report may further include an evaluation of the information about the delivery based on the one or more service metrics and an enhanced QCI.

Example 27. A method including receiving, from a content service subscriber, a request for a delivery of a specified content to a point-of-delivery device; responsive to the request, providing to an application service manager one or more service metrics pertaining to the delivery, the application service manager providing a capability to manage an end-to-end communications channel comprising at least one wireless transport path and at least one wireline transport path; receiving, from the application service manager, a confirmation that the delivery can proceed in accordance with the one or more service metrics; and facilitating provision of the specified content to proceed with the delivery via the end-to-end communications channel under direction of the application service manager in accordance with the one or more service metrics.

Example 28. The method of example 27 wherein facilitating provision of the specified content includes providing access to a cloud-based content repository from which at least a portion of the specified content is available.

Example 29. The method of example 27 wherein facilitating provision of the specified content includes providing access to an edge cache where at least a portion of the specified content is stored.

Example 30. The method of example 27 further including receiving a delivery report from the application service manager, the report including information about the delivery, the information being obtained by monitoring at least one of the transport paths of the end-to-end communications channel.

Example 31. The method of example 30 wherein the report is received during the delivery.

Example 32. The method of example 30 wherein the report is received after completion of the delivery.

Example 33. The method of example 30 wherein the delivery report further includes an evaluation of the information about the delivery based on the one or more service metrics and an enhanced CQI.

Example 34. A method includes receiving a request for delivery of content to a point-of-delivery device over a wireless network, wherein the request includes one or more service metrics and a Quality of Service Class Identifier ("QCI"), facilitating an allocation of resources of the wireless network based on the service metrics and the QCI, sending wireline transmission parameters associated with the service metrics and the QCI to a wireline manager of a wireline network wherein the wireline network is in communication with the wireless network, establishing an end-to-end communication channel between a content collection point and the point-of-delivery device using a combination of the wireline network and the wireless network, delivering the content to the point-of-delivery device via the end-to-end communication channel in accordance with the wireline transmission parameters, the service metrics and the QCI, wherein receiving the request comprises receiving the request from the point-of-delivery device and wherein the QCI is an enhanced QCI associated with the point-of-delivery device.

Example 35. The method of example 34 wherein the service metrics are included in a service level agreement for the end-to-end communication channel, and wherein receiving the service metrics includes receiving the service level agreement.

Example 36. The method of example 34 further comprising operating an application service manager that facilitates one or more of the sending, the establishing or the delivering.

Example 37. The method of example 36 further comprising monitoring performance of the wireless network, wherein the application service manager facilitates the monitoring.

Example 38. The method of example 34 wherein QCI is an enhanced QCI and the enhanced QCI is associated with one of the point-of-delivery device or a content delivery device other than the point-of-delivery device.

Example 39. The method of example 34 wherein at least one of the service metrics is associated with the point-of-delivery device.

Example 40. The method of example 39 wherein QCI is an enhanced QCI and the enhanced QCI is associated with the point-of-delivery device.

Figure 6:
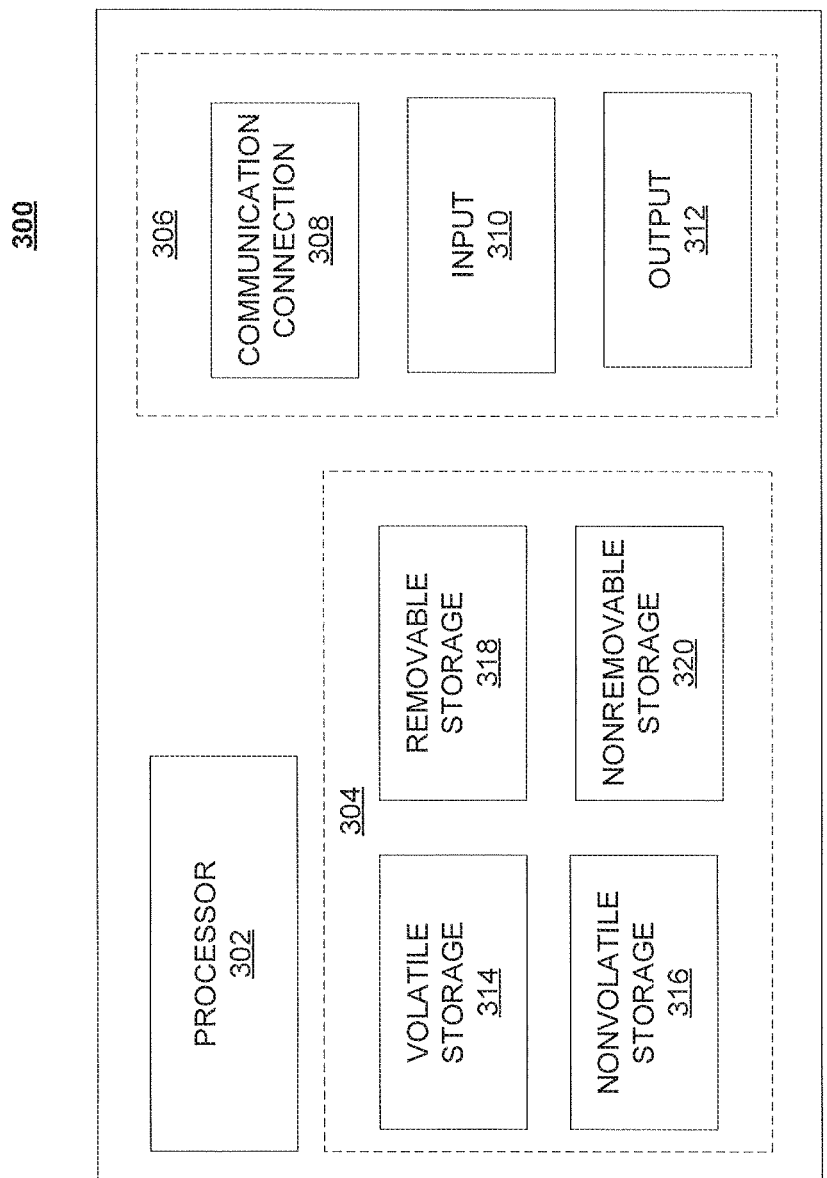
FIG. 6 is a schematic of an exemplary network device.

FIG. 6 is a block diagram of network device 300 that may be connected to or comprise a component of edge computing node or connected to edge computing node via a network. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled with processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 6) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
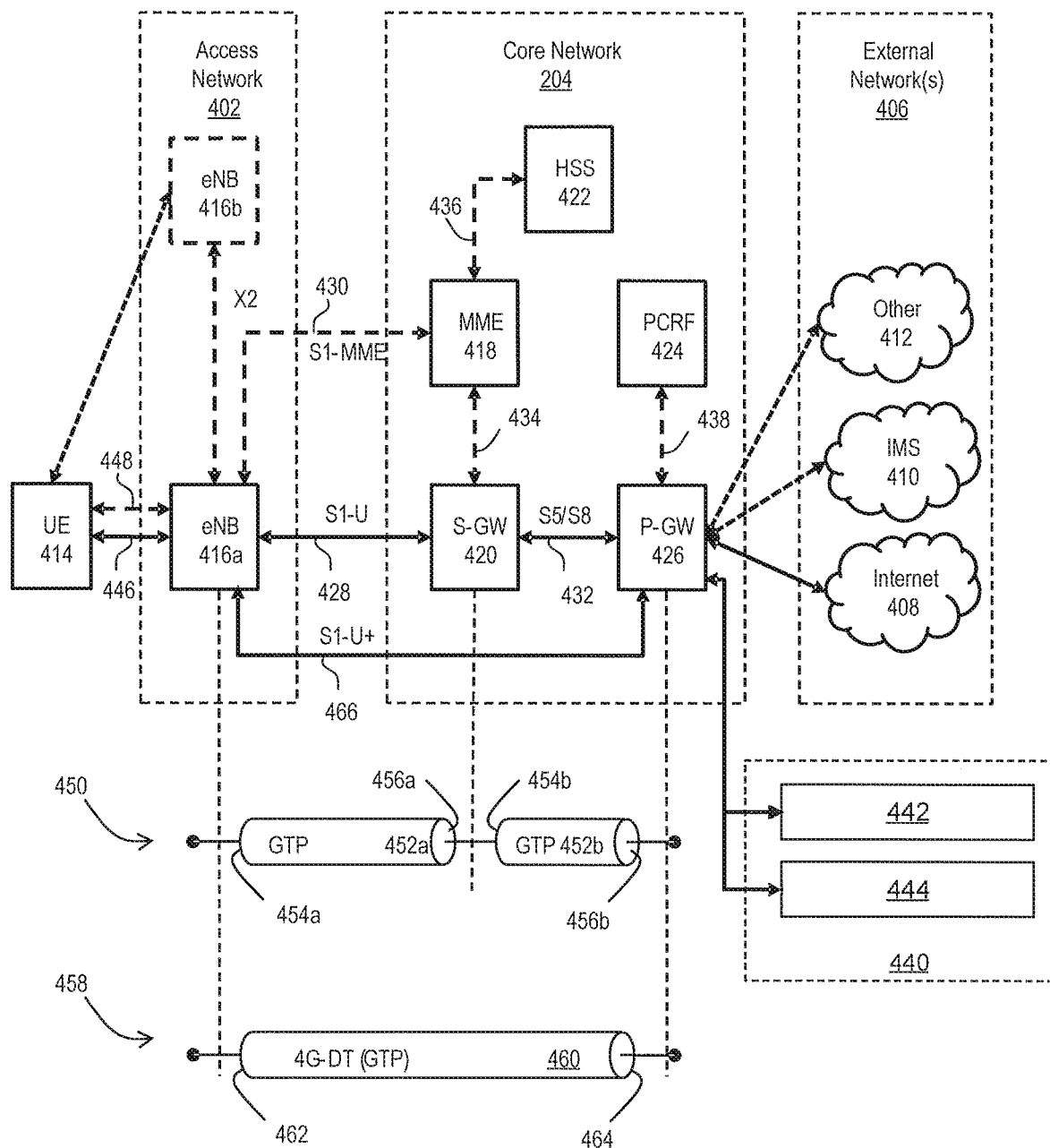
FIG. 7 depicts an exemplary communication system that provide wireless telecommunication services over wireless communication networks with which edge computing node may communicate.

FIG. 7 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled with storage device 440, shown in phantom. Storage device 440 can be integral to one of the network nodes, such as PGW 426, for example, in the form of internal memory or disk drive. It is understood that storage device 440 can include registers suitable for storing address values. Alternatively, or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into storage locations 442 or 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 7. In other words, either or both of access network 402 and the core network 404 can include additional network elements that are not shown, such as various routers, switches, and controllers. In addition, although FIG. 7 illustrates only one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 7. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 8:
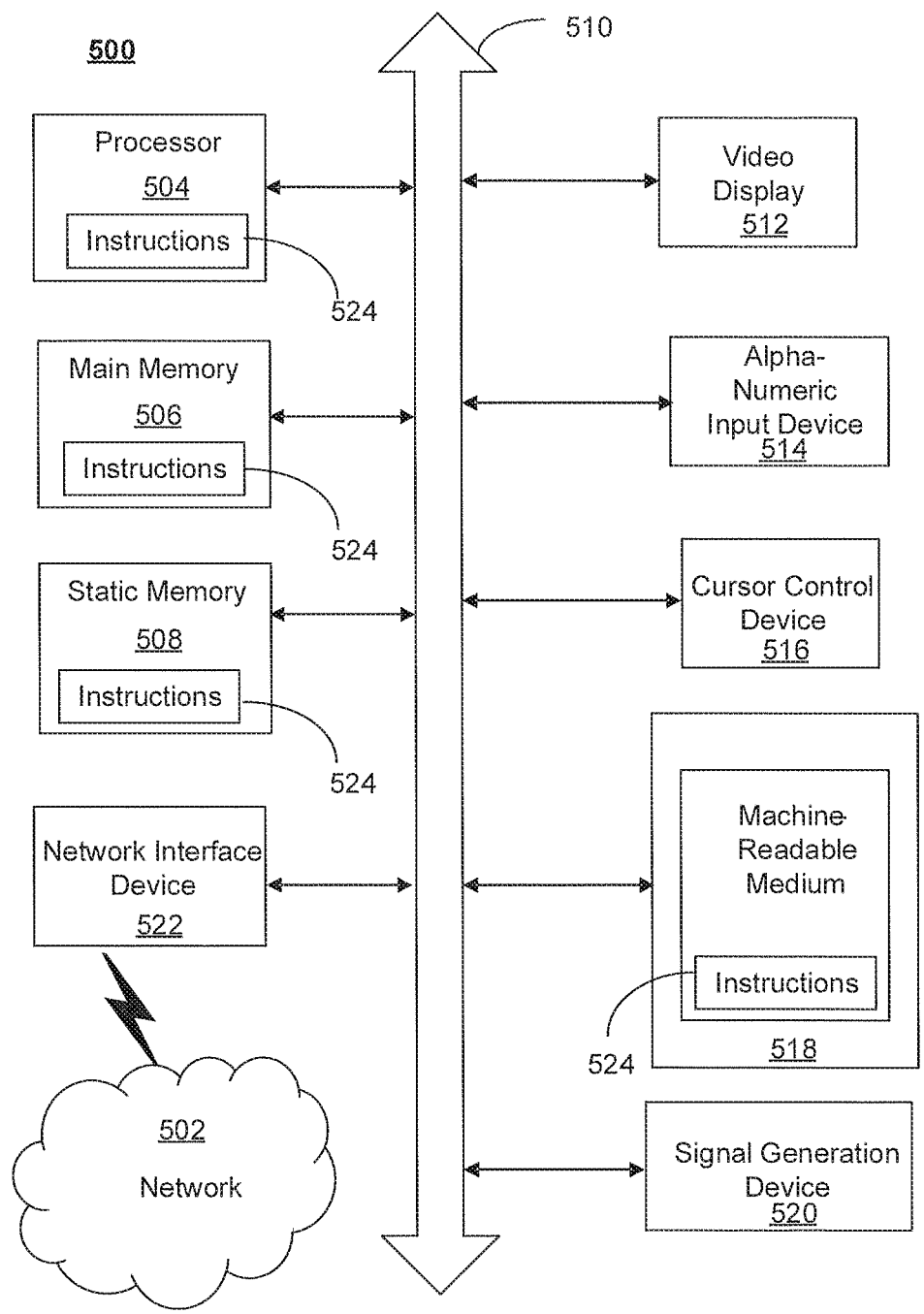
FIG. 8 depicts an exemplary communication system that provide wireless telecommunication services over wireless communication networks with which edge computing node may communicate.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9:
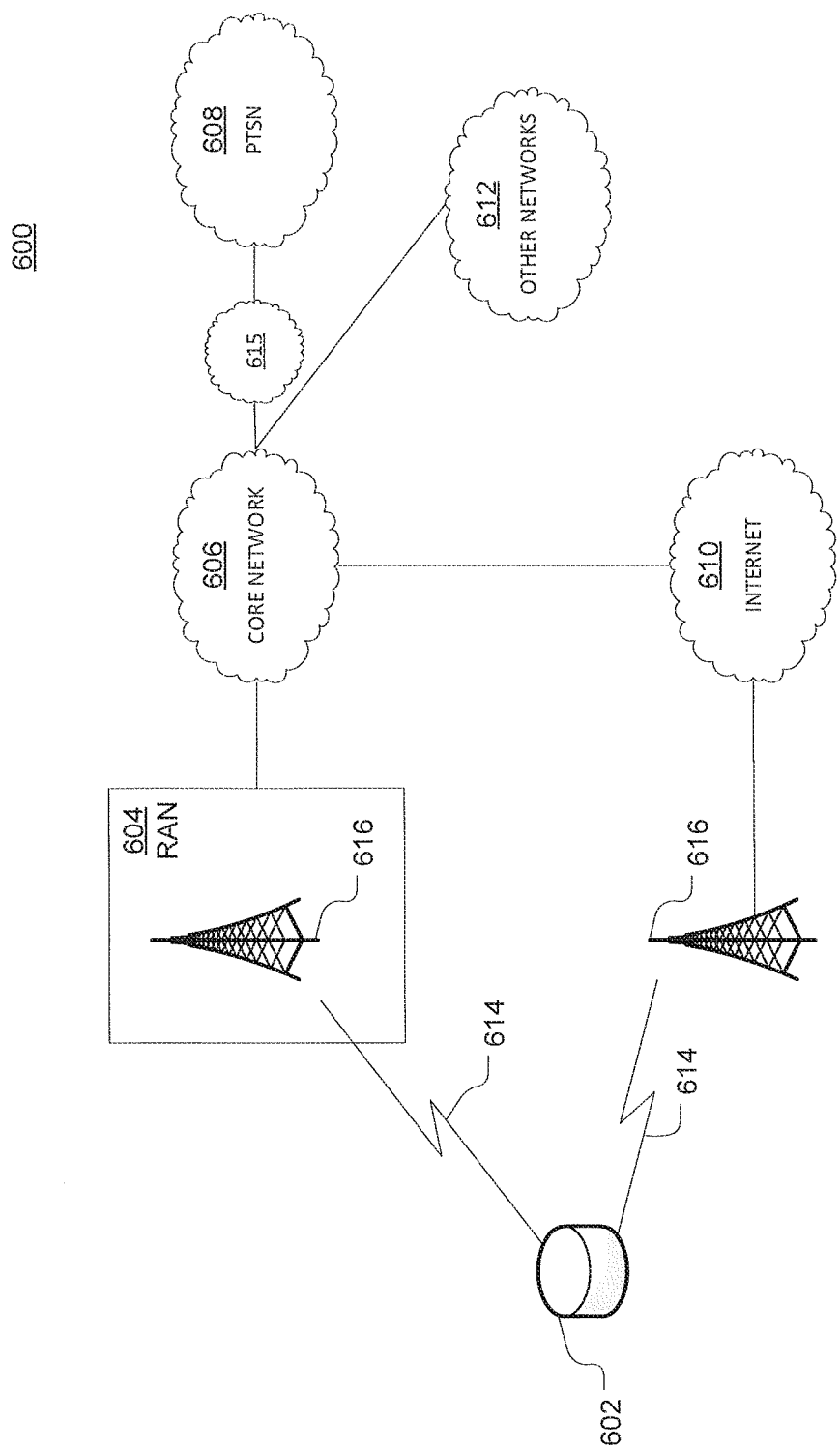
FIG. 9 is a diagram of an exemplary telecommunications system in which the disclosed methods and processes may be implemented with which edge computing node may communicate.

As shown in FIG. 9, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 9, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 9, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 10:
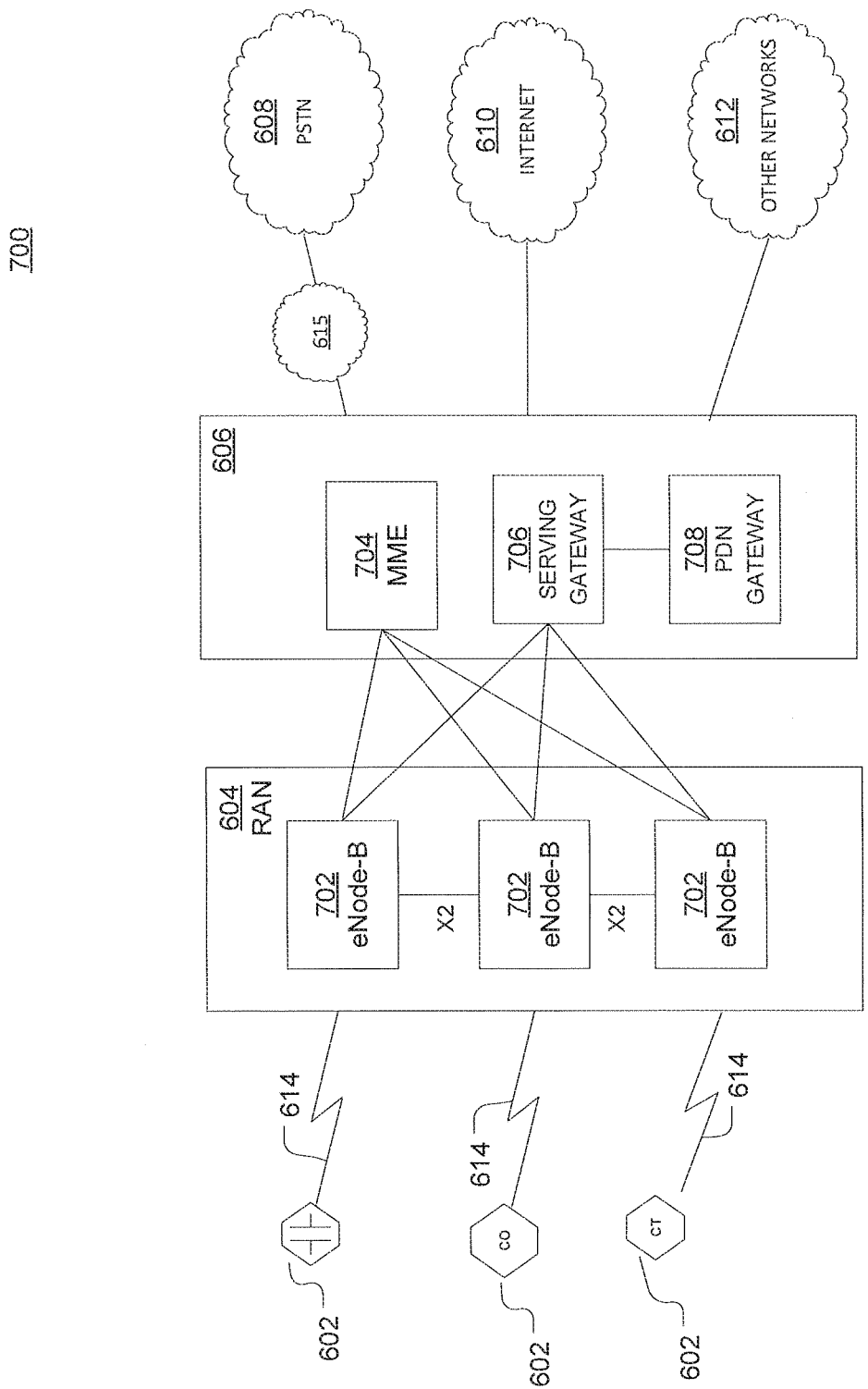
FIG. 10 is an example system diagram of a radio access network and a core network with which edge computing node may communicate.

FIG. 10 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeB s 702 may implement MIMO technology. Thus, one of eNodeBs 702, for example, may use multiple antennas to transmit wireless signals to, or receive wireless signals from, one of WTRUs 602.

Each of eNodeBs 702 may be associated with a cell (not shown) and may be configured to handle radio resource management decisions, handover decisions, scheduling of users in the uplink or downlink, or the like. As shown in FIG. 10 eNodeBs 702 may communicate with one another over an X2 interface.

Core network 606 shown in FIG. 10 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeB s 702 in RAN 604 via an S1 interface and may serve as a control node. For example, MME 704 may be responsible for authenticating users of WTRUs 602, bearer activation or deactivation, selecting a serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 11:
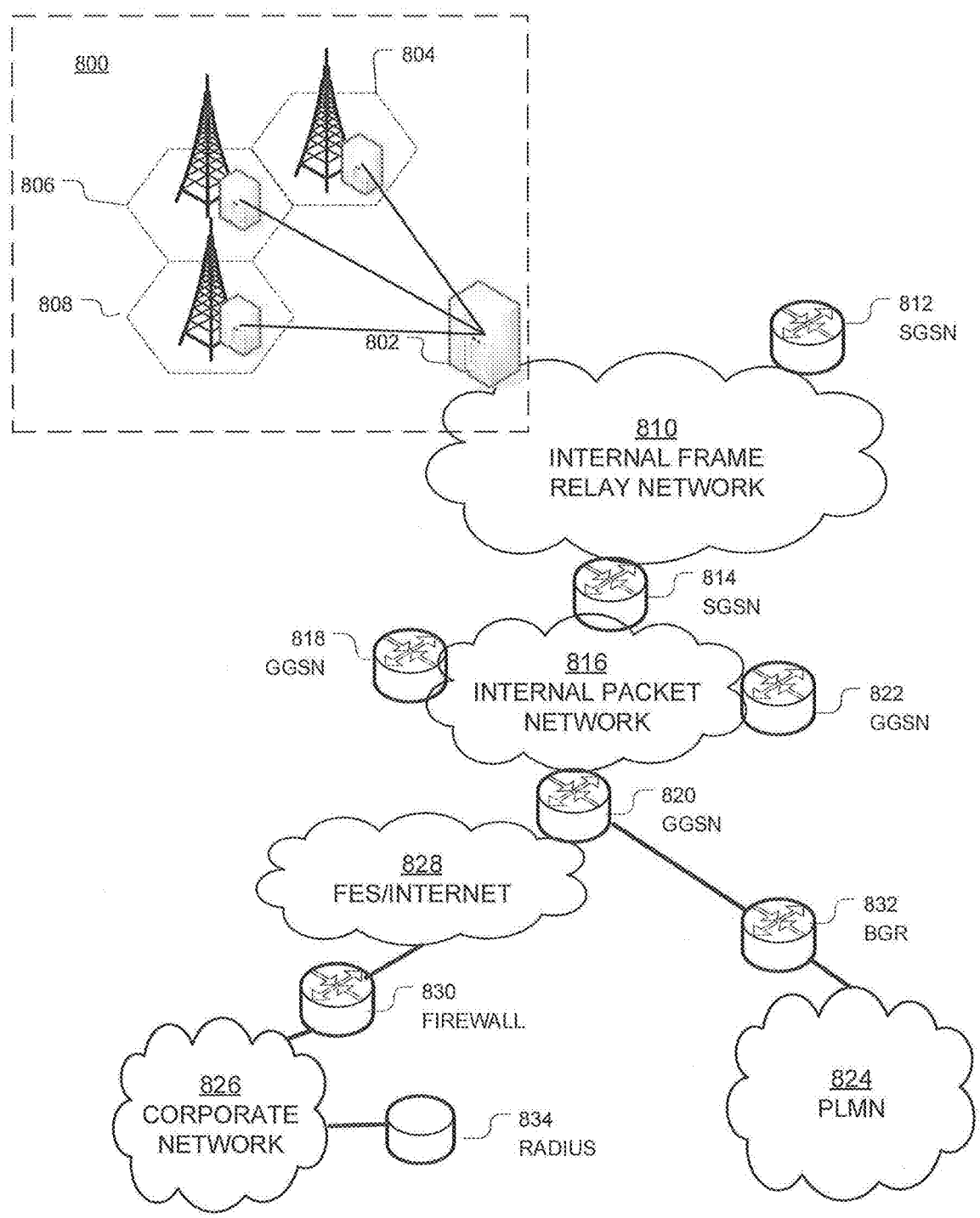
FIG. 11 depicts an overall block diagram of an example packet-based mobile cellular network environment, such as a general packet radio service (GPRS) network, with which edge computing node may communicate.

FIG. 11 depicts an overall block diagram of an example packet-based mobile cellular network environment, such as a GPRS network as described herein. In the example packet-based mobile cellular network environment shown in FIG. 11, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 12:
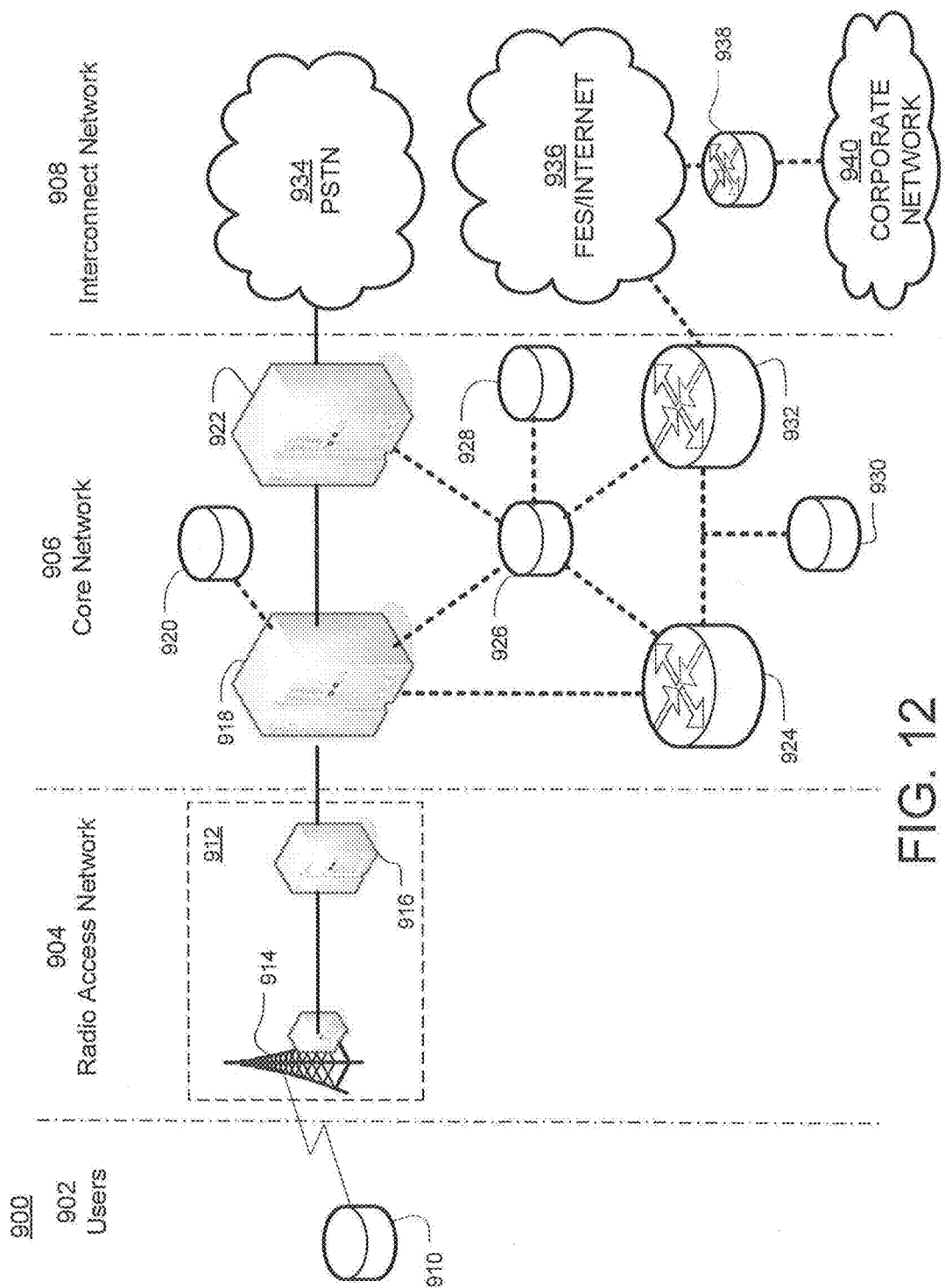
FIG. 12 illustrates an exemplary architecture of a GPRS network with which edge computing node may communicate.

FIG. 12 illustrates an architecture of a typical GPRS network 900 as described herein. The architecture depicted in FIG. 12 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 12. In an example, device 910 comprises a communications device (e.g., IoT devices 32, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 12, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 12, interconnect network 908 comprises a PSTN 934, a FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 13:
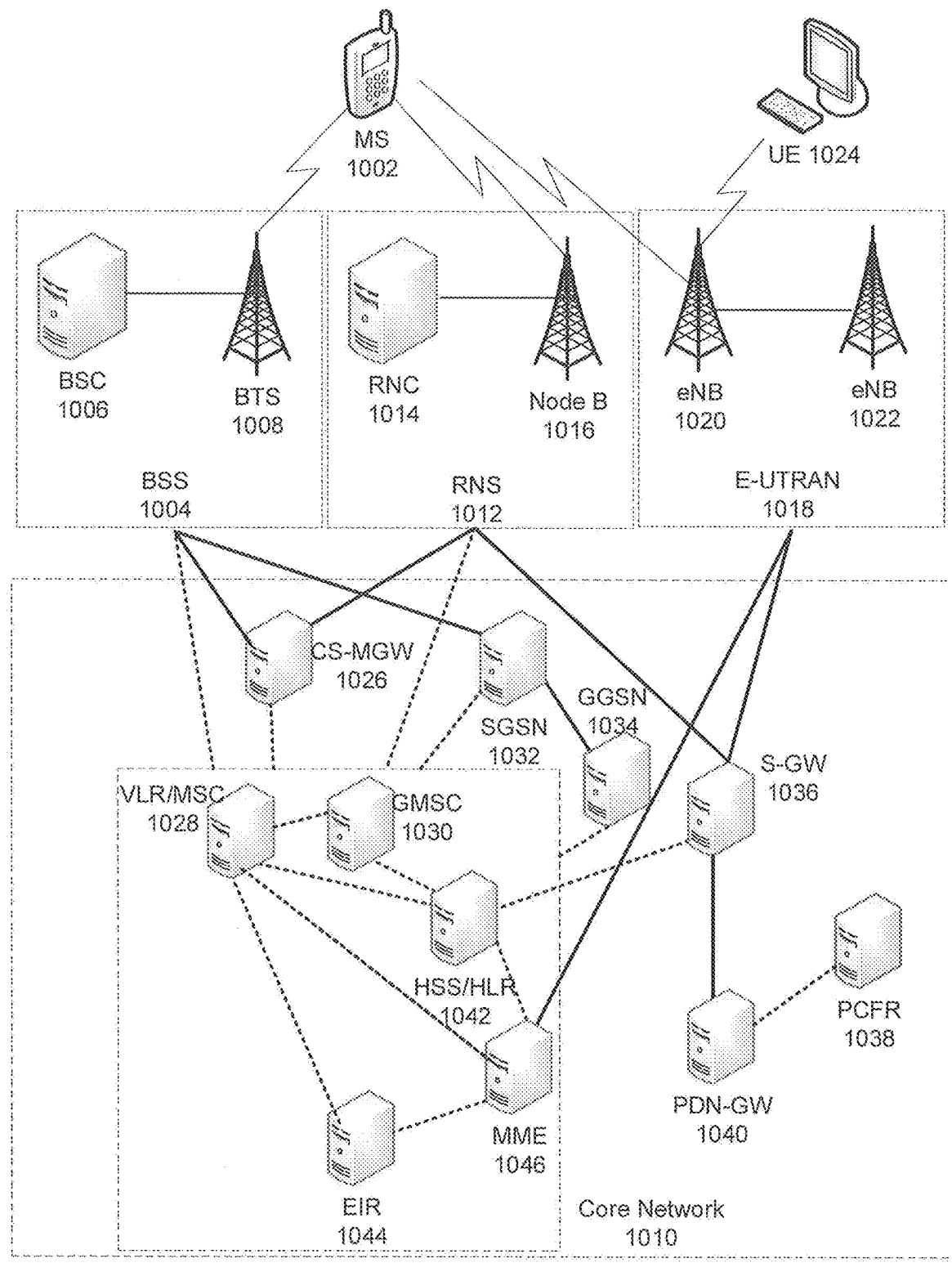
FIG. 13 is a block diagram of an exemplary public land mobile network (PLMN) with which edge computing node may communicate.

FIG. 13 illustrates a PLMN block diagram view of an example architecture that may be replaced by a telecommunications system. In FIG. 13, solid lines may represent user traffic signals, and dashed lines may represent support signaling. MS 1002 is the physical equipment used by the PLMN subscriber. For example, IoT devices 32, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNB s. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as "white listed" or "black listed" depending on its status in the network. If MS 1002 is stolen and put to use by an unauthorized user, it may be registered as "black listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A method comprising:
monitoring, by a processing system including a processor, performance of a wireless network of an end-to-end communication channel comprising a wireline network in communication with the wireless network, the end-to-end communication channel adapted to deliver content between a content collection point and a point-of-delivery device according to a service metric and a Quality of Service Class Identifier (QCI), wherein parameters of the wireline network are associated with the service metric and the QCI;
modifying, by the processing system, the QCI according to the monitoring to obtain a modified value QCI;
modifying, by the processing system, the parameters of the wireline network based on the modified value QCI to obtain modified parameters; and
transmitting, by the processing system, the modified parameters to a wireline manager to facilitate delivery of the content to the point-of-delivery device via the end-to-end communication channel in accordance with the modified parameters, the service metric and the modified value QCI, wherein the parameters of the wireline network include wireline control plane resources and wireline data plane resources.

2. The method of claim 1 wherein the QCI comprises a measure of signal-to-interference-plus-noise ratio.

3. The method of claim 2 wherein the modified value QCI comprises the measure of signal-to-interference-plus-noise ratio from an initial value to the modified value QCI.

4. The method of claim 2 wherein the modified value QCI is an enhanced QCI comprising the measure of signal-to-interference-plus-noise ratio and one of a device metric, a performance metric, a device diagnostic, or a combination thereof.

5. The method of claim 1 wherein QCI is an enhanced QCI comprising a measure of signal-to-interference-plus-noise ratio and at least one of device metrics, performance metrics, or device diagnostics.

6. The method of claim 1 wherein the service metric includes a priority level and wherein the parameters of the wireline network include the priority level.

7. The method of claim 6 wherein the point-of-delivery device includes a memory buffer for the content and wherein use of the memory buffer is based on the priority level.

8. The method of claim 1 wherein the point-of-delivery device is a first point-of-delivery device and wherein the content originates from a second point-of-delivery device, and further comprising receiving response content from the first point-of-delivery device and delivering the response content to the second point-of-delivery device.

9. The method of claim 1 wherein the parameters of the wireline network include an indication that a delay associated with delivering the content is to be treated by the wireline manager as not inconsistent with the service metric.

10. The method of claim 9 wherein the delay is implemented by queuing content to an edge of the wireline network for delivery by the wireless network when wireless resources are available.

11. The method of claim 1 further comprising receiving wireline network performance metrics from the wireline manager and adjusting an allocation of wireless resources based on the wireline network performance metrics.

12. The method of claim 1 further comprising generating wireless network performance metrics and adjusting the parameters of the wireline network based on the wireless network performance metrics.

13. The method of claim 1 wherein the service metric is associated with at least one of an access point, the point-of-delivery device, and a requested time of delivery.

14. The method of claim 1 wherein the point-of-delivery device is moving and wherein the method further comprises receiving a modified value QCI based on movement of the point-of-delivery device and the parameters of the wireline network are based on the modified value QCI.

15. A device comprising:
a processing system including a processor; and
a memory that stores executable instructions that, when executed by the processing system, facilitate performance of operations, the operations comprising:
monitoring performance of a wireless network of a communication channel comprising a wireline network in communication with the wireless network, the communication channel adapted to deliver content between a content collection point and a point-of-delivery device, according to a service metric and a Quality of Service Class Identifier (QCI), wherein parameters of the wireline network are associated with the service metric and the QCI;
modifying the QCI according to the monitoring to obtain a modified value QCI;
updating the parameters of the wireline network based on the modified value QCI to obtain updated parameters; and
providing the updated parameters to a wireline manager to facilitate delivery of the content to the point-of-delivery device via the communication channel in accordance with the updated parameters, the service metric and the modified value QCI, wherein the parameters of the wireline network include wireline control plane resources and wireline data plane resources.

16. The device of claim 15, wherein the QCI comprises a measure of signal-to-interference-plus-noise ratio.

17. The device of claim 16, wherein the modified value QCI is an enhanced QCI comprising the measure of signal-to-interference-plus-noise ratio and one of a device metric, a performance metric, a device diagnostic, or a combination thereof.

18. A non-transitory, machine-readable medium, comprising executable instructions that, when executed by a processing system including a processor, facilitate performance of operations, the operations comprising:
monitoring performance of a wireless network of an end-to-end communication channel comprising a wireline network in communication with the wireless network, the end-to-end communication channel adapted to deliver content between a content collection point and a point-of-delivery device according to a service metric and a Quality of Service Class Identifier (QCI), wherein parameters of the wireline network are associated with the service metric and the QCI;
modifying the QCI according to the monitoring to obtain a modified value QCI;
modifying the parameters of the wireline network based on the modified value QCI to obtain modified parameters; and
providing the modified parameters to a wireline manager to facilitate delivery of the content to the point-of-delivery device via the end-to-end communication channel in accordance with the modified parameters, the service metric and the modified value QCI, wherein the parameters of the wireline network include wireline control plane resources and wireline data plane resources.

19. The non-transitory, machine-readable medium of claim 18, wherein the modified value QCI is an enhanced QCI comprising a measure of signal-to-interference-plus-noise ratio and one of a device metric, a performance metric, a device diagnostic, or a combination thereof.

* * * * *